(12) United States Patent
Tanimoto et al.

(10) Patent No.: US 7,778,184 B2
(45) Date of Patent: Aug. 17, 2010

(54) COMMUNICATION SYSTEM AND REMOTE DIAGNOSIS SYSTEM

(75) Inventors: Yoshifumi Tanimoto, Kyoto (JP); Chikayoshi Yazaki, Kyoto (JP)

(73) Assignee: Murata Kikai Kabushiki Kaisha, Kyoto-shi (JP)

(*) Notice: Subject to any disclaimer, the term of this patent is extended or adjusted under 35 U.S.C. 154(b) by 654 days.

(21) Appl. No.: 11/806,880

(22) Filed: Jun. 5, 2007

(65) Prior Publication Data

US 2007/0280228 A1 Dec. 6, 2007

(30) Foreign Application Priority Data

Jun. 6, 2006 (JP) ............................. 2006-157331
Jun. 6, 2006 (JP) ............................. 2006-157332

(51) Int. Cl.
*H04J 1/16* (2006.01)
*H04L 12/56* (2006.01)
(52) U.S. Cl. ................ 370/241; 370/389; 370/401; 370/466
(58) Field of Classification Search ........... 370/389, 370/401, 241, 466
See application file for complete search history.

(56) References Cited

U.S. PATENT DOCUMENTS

| | | | |
|---|---|---|---|
| 6,415,331 B1* | 7/2002 | Ariga | 709/246 |
| 2001/0055317 A1* | 12/2001 | Kajizaki et al. | 370/474 |
| 2002/0101860 A1* | 8/2002 | Thornton et al. | 370/352 |
| 2004/0132452 A1* | 7/2004 | Lee | 455/445 |
| 2004/0233898 A1* | 11/2004 | Otsuka et al. | 370/352 |
| 2005/0018657 A1* | 1/2005 | Nakao et al. | 370/352 |
| 2005/0147028 A1* | 7/2005 | Na et al. | 370/217 |
| 2005/0246346 A1* | 11/2005 | Gerdes et al. | 707/10 |
| 2006/0072569 A1* | 4/2006 | Eppinger et al. | 370/389 |
| 2006/0168274 A1* | 7/2006 | Aloni et al. | 709/230 |

(Continued)

FOREIGN PATENT DOCUMENTS

JP 2004-120547 B1 4/2004

(Continued)

OTHER PUBLICATIONS

Japanese Notification of Reason(s) for Refusal dated Apr. 17, 2008, issued in corresponding Japanese Patent Application No. 2006-157331.

*Primary Examiner*—John Pezzlo
(74) *Attorney, Agent, or Firm*—Westerman, Hattori, Daniels & Adrian, LLP

(57) ABSTRACT

An object of the present invention is to provide a technique capable of promptly and efficiently starting a communication processing when a demand is generated, in a communication system including a terminal for a non-continuous connection. A communication terminal and a device can be connected through a relay device, and when the communication terminal transmits a UDP packet to the device, the relay device receives the UDP packet and transmits a control signal to the device. The device makes a dial-up connection to establish a PPP session, and establishes a TCP connection with the relay device. By using this TCP connection, the communication terminal transmits an inspection instruction file to the device. The device conducts an inspection in accordance with the inspection instruction file, prepares an inspection result file, and returns it to the communication terminal. Then, the device disconnects the TCP connection, the PPP session, and the dial-up line network.

9 Claims, 14 Drawing Sheets

U.S. PATENT DOCUMENTS

| | | | |
|---|---|---|---|
| 2006/0190992 A1* | 8/2006 | Li et al. | 726/3 |
| 2006/0227738 A1* | 10/2006 | Nakajima et al. | 370/328 |
| 2006/0242242 A1* | 10/2006 | Ezumi et al. | 709/206 |
| 2007/0086445 A1* | 4/2007 | Mattaway et al. | 370/352 |
| 2007/0244987 A1* | 10/2007 | Pedersen et al. | 709/217 |
| 2007/0254648 A1* | 11/2007 | Zhang et al. | 455/433 |
| 2008/0181572 A2* | 7/2008 | Kikkawa et al. | 386/46 |
| 2008/0261632 A1* | 10/2008 | Hind et al. | 455/466 |
| 2009/0150977 A1* | 6/2009 | Carley | 726/3 |
| 2009/0164611 A1* | 6/2009 | Corda et al. | 709/222 |
| 2009/0205026 A1* | 8/2009 | Haff et al. | 726/5 |

FOREIGN PATENT DOCUMENTS

| | | |
|---|---|---|
| JP | 2005-210575 A | 8/2005 |
| JP | 2005-2886944 A | 10/2005 |

* cited by examiner

US 7,778,184 B2

COMMUNICATION SYSTEM AND REMOTE DIAGNOSIS SYSTEM

This application claims priority under 35 U.S.C. 119 to Japanese Patent Application No. 2006-157331, filed on Jun. 6, 2006 and No. 2006-157332, filed on Jun. 6, 2006, which applications are hereby incorporated by reference in their entirety.

BACKGROUND OF THE INVENTION

1. Field of the Invention

The present invention relates to a communication processing technique in a communication system including a terminal of a non-continuous connection.

2. Description of Related Art

As a connection mode of a terminal to a network, a continuous connection and a non-continuous connection are given as examples. When a terminal is continuously connected to a network, a fixed IP address can be assigned to the terminal. Accordingly, in a communication system including a continuously connected terminal, communication can be performed by establishing a TCP connection to this terminal at an arbitrary time. Meanwhile, when the terminal is non-continuously connected to the network, the IP address of the terminal is not fixed, and therefore skill is required for making communication to this terminal. For example, when the terminal is connected to the network through a dial-up, the IP address is assigned to this terminal from a dial-up server every time the dial-up connection is made. Accordingly, the TCP connection cannot be established to this terminal at an arbitrary time.

Japanese Patent Laid-Open Publication No. 2005-210575 proposes a technique for promptly making data communication even when a terminal without a fixed IP address is included in an information system. Specifically, in Japanese Patent Laid-Open Publication No. 2005-210575, a continuously fixed IP address is not assigned to an IP adapter 40. This IP adapter 40 periodically transmits a UDP packet to a server 42, and periodically reports the IP address of its own device. Then, when a control request signal is generated to the server 42 from a cellular phone 44, the server 42 can instantly connect with the IP adapter 40, because the IP address of the IP adapter 40 is known. Thus, when a trigger of processing is generated from the cellular phone 44, it is possible to perform data communication promptly through the server 42 and the IP adapter 40.

As described above, when the terminal making a non-continuous connection is included in the communication system, skill is required for making connection to this terminal. According to Japanese Patent Laid-Open Publication No. 2005-210575, the UDP packet is periodically transmitted to the server by the terminal (IP adapter 40) on a receiving side, thereby continuously reporting the IP address of its own device.

However, the terminal on the receiving side must continue to send the UDP packet all the time. Even if a transmission request from a transmitting side is not generated, the UDP packet must be continuously sent to the server, and this is inefficient.

Also, for example, when there are a plurality of terminals non-continuously connected to the communication system, the UDP packet is continuously transmitted to the server from all of these terminals, and this is not only inefficient but also imposes a substantial load on the server.

In addition, when a non-continuous communication line network is used, another problem is involved. In a line network of the non-continuous communication, in some cases, it is difficult for a particular terminal to maintain a communication state. For example, in order to provide a service to many users, the line in which no traffic is generated for a prescribed time is sometimes disconnected. When the transmission of a packet is not performed for a prescribed time, this line may sometimes be disconnected depending on the type of the dial-up router.

In this way, in the communication system including the terminal of the non-continuous connection, first, skill is required for making a communicable state promptly, and further skill is required for maintaining the communication state until transmission and reception of required information is completed. This is because when a communication error, etc. occurs in the middle of the transmission and reception of data, a recovery processing is required, thus involving a complicated processing.

Therefore, in view of the above-described problems, an object of the present invention is to provide a technique capable of promptly and efficiently starting communication processing when a demand for communication is generated, in a communication system including the terminal of the non-continuous connection.

In addition, another object of the present invention is to provide a technique for promptly and efficiently starting the communication processing when the demand for communication is generated and for normally completing the communication, in a communication system including the terminal of the non-continuous connection.

SUMMARY OF THE INVENTION

In order to overcome the problems described above, preferred embodiments of the present invention provide a communication system including a first communication device, a relay device which is continuously connected to the first communication device, and a second communication device which is connected to the relay device by a communication network established by a connection demand from the second communication device. The first communication device includes a unit for transmitting to the relay device a UDP packet targeted to the second communication device, the relay device includes a unit for transmitting a control signal to the second communication device by using prescribed means, when the UDP packet transmitted from the first communication device is received, and the second communication device includes a unit for establishing the communication network by making the connection demand to the relay device and transmitting a TCP connection demand to the first communication device, when the control signal is received.

In addition, the first communication device repeatedly transmits the UDP packet to the second communication device a prescribed number of times.

In addition, the first communication device transmits to a standby status for the TCP connection from the second communication device, after the UDP packet is transmitted a prescribed number of times.

Another preferred embodiment of the present invention provides a remote diagnosis system including a control device, a relay device which is continuously connected to the control device, and an inspection target device which is connected to the relay device by a communication network established by a connection demand from the inspection target device. The control device includes a unit for transmitting a UDP packet to the inspection target device, the relay device includes a unit for transmitting a control signal to the inspection target device by using prescribed means when the UDP packet transmitted from the control device is received, the inspection target device includes a unit for establishing the communication network by making the connection demand to the relay device and transmitting a TCP connection demand to the control device, when the control signal is received, and by the TCP connection demand from the inspection target device, a TCP connection is established between the control device and the inspection target device, and thereafter the control device transmits an inspection instruction file to the inspection target device by using this TCP connection.

In addition, the inspection device that receives the inspection instruction file conducts an inspection according to the inspection instruction file, and thereafter transmits an inspection result file to the control device by using the TCP connection used when the inspection instruction file is transmitted.

In addition, the control device repeatedly transmits the UDP packet to the inspection target device a prescribed number of times.

In addition, the control device transmits to a standby status for the TCP connection from the inspection target device, after the UDP packet is transmitted a prescribed number of times.

Further, another embodiment of the present invention provides a communication system including a first communication device, a relay device which is continuously connected to the first communication device, and a second communication device which is connected to the relay device by a communication network established by a connection demand from the second communication device. The second communication device includes a unit for establishing the communication network by making the connection demand to the relay device and transmitting a TCP connection demand to the first communication device, the first communication device includes a unit for establishing a TCP connection with the second communication device by the TCP connection demand from the second communication device and transmitting a transmission file to the second communication device by designating a reply mode, and the second communication device transmits a reply file while maintaining the TCP connection used in receiving the transmission file when a first mode is designated as the reply mode, and when a second mode is designated, disconnects the communication network with the relay device, and after a communication network with the relay device is established again, establishes a new TCP connection and transmits the reply file.

In addition, the second communication device establishes the communication network again after the communication network with the relay device is disconnected and when the transmission of the reply file is prepared.

In addition, even when the first mode is designated as the reply mode, the second communication device disconnects the communication network with the relay device when it determines that the time required for reply processing of the reply file corresponds to a prescribed condition, and after establishing the communication network with the relay device again, establishes a new TCP connection and transmits the reply file.

According to the communication system of the present invention, when the relay device receives the UDP packet from the first communication device, the control signal is transmitted to the second communication device, and after the second communication device establishes the communication network by making the connection demand to the relay device, the TCP connection demand is transmitted to the first connection device. Accordingly, when the communication network is established between the second communication device and the relay device, the TCP connection can be established with the first communication device at an early timing. Namely, when the communication demand is generated to the second communication device from the first communication device, the communication processing can be started at an early timing.

Then, when the transmission request is generated, the UDP packet is transmitted from the first communication device on the side of generating the transmission request, and therefore an efficient system configuration is possible without transmitting a number of UDP packets even when there is no need for communication.

In addition, the first communication device repeatedly transmits the UDP packet to the second communication device a prescribed number of times. Unlike the TCP packet, in a case of the UDP packet, re-transmission processing is not performed, and therefore the connection demand can surely be sent to the second communication device without complicating a control.

After the UDP packet is transmitted a prescribed number of times, the first communication device transmits to the standby status for the TCP connection from the second communication device. Since the first communication device of a demand source transmits to the standby status, the TCP connection can be established instantly at the point in time when the TCP connection demand from the second communication is generated.

In addition, the communication system according to the present invention designates whether or not the second communication device transmits the reply file by using the same connection as the TCP connection used when the first communication device transmits the transmission file, or whether or not the reply file is transmitted by using a new TCP connection after the line is disconnected once. Thus, in the second communication terminal, it is possible to prevent such a situation that a time is required for processing the reply file, and the line is disconnected during the reply processing, thus complicating the processing. For example, when it is previously known that a time is required for preparing the reply file, the processing is smoothly performed by setting a mode of disconnecting the line once.

In addition, even when the first communication device designates to return the reply file while maintaining the TCP connection at the time of transmitting the transmission file, the second communication device disconnects the communication network once when the processing of the reply file corresponds to a prescribed condition. Thus, when a time is required for reply processing under an unexpected circumstance, the communication network is re-connected. Therefore, the processing can be completed under a normal condition, without allowing a processing error to be generated.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

DETAILED DESCRIPTION OF PREFERRED EMBODIMENTS (First embodiment) Preferred embodiments of the present invention will be described below with reference to the drawings. FIG. 1 is a block diagram illustrating a system configuration of a remote diagnosis system according to the present embodiment. This remote diagnosis system includes a communication terminal 10 installed in a center 1; a relay device 30; and devices 50 installed in a factory 5. The communication terminal 10 and the relay device 30 are connected through the Internet 2. In addition, the relay device 30 and each device 50 are connected through a public telephone line network 4.

Figure 1:
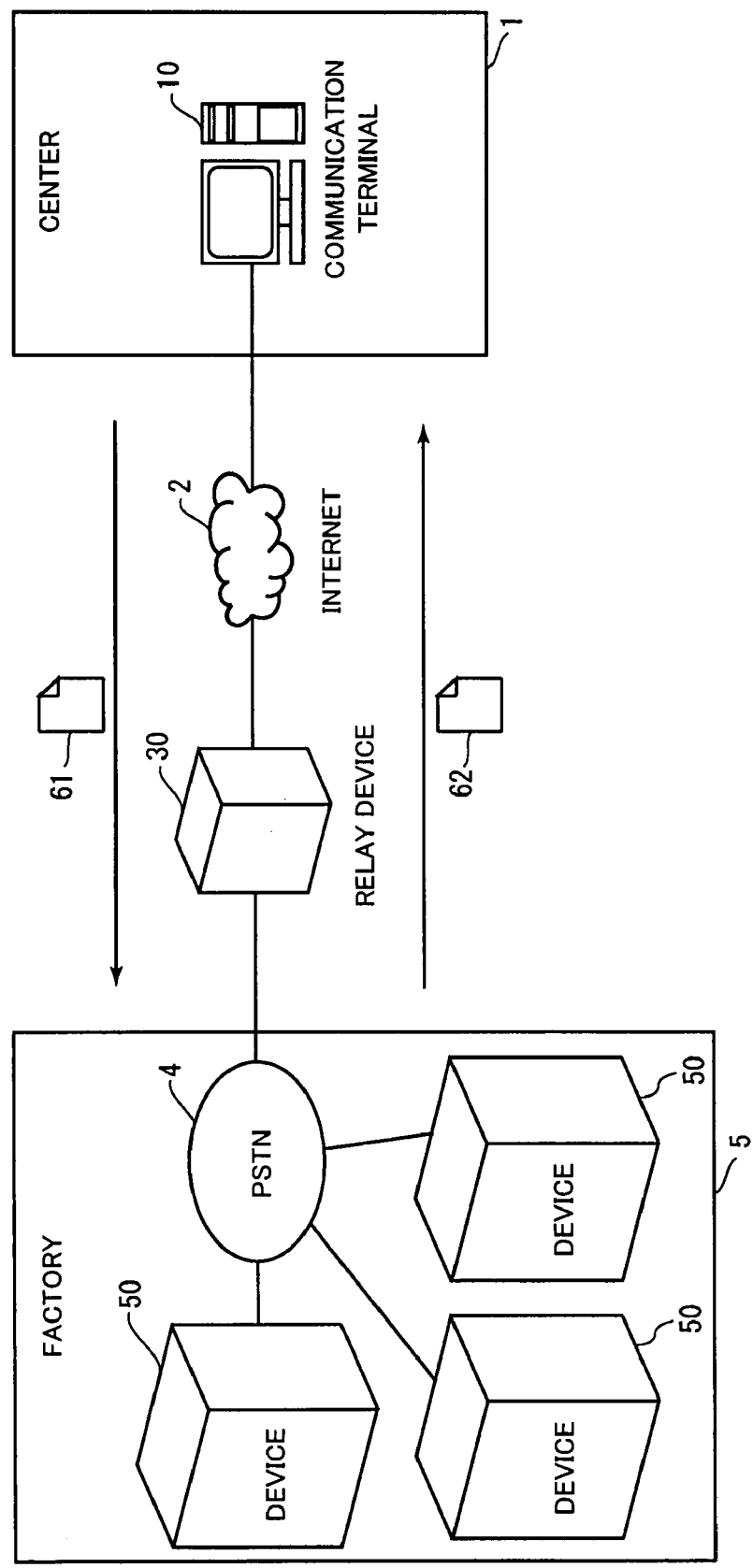
FIG. 1 is a block diagram illustrating a system configuration of a remote diagnosis system according to a first embodiment.

This remote diagnosis system is a system for remotely conducting a diagnosis on the device 50 in the factory 5 from a center 1 at a distant place. Specifically, this is a system in which an inspection instruction file 61 is transmitted to the device 50 through a network from the communication terminal 10 at the center 1, and an result of the inspection executed in the device 50 is returned to the communication terminal 10 from the device 50 through the network, as an inspection result file 62. Thus, it is possible to give a diagnosis on a condition of the device 50 in the factory 5, in the center 1 that exists at a distant place.

Here, the communication terminal 10 and the relay device 30 are continuously connected to the Internet 2. Namely, fixed IP addresses are assigned to the communication terminal 10 and the relay device 30. Accordingly, the communication terminal 10 and the relay device 30 can establish the TCP connection by issuing a TCP connection demand from either of the terminals (devices), when the communication needs to be performed.

Meanwhile, the relay device 30 and each device 50 are connected through a public telephone line network 4 physically. However, by making a dial-up connection to the relay device 30 from the device 50, a communicable condition can be achieved for the first time. Contrarily, the dial-up connection cannot be made from the relay device 30 to the device 50. Namely, in order to perform communication between the relay device 30 and the device 50, the dial-up connection needs to be made from the device 50.

Figure 2:
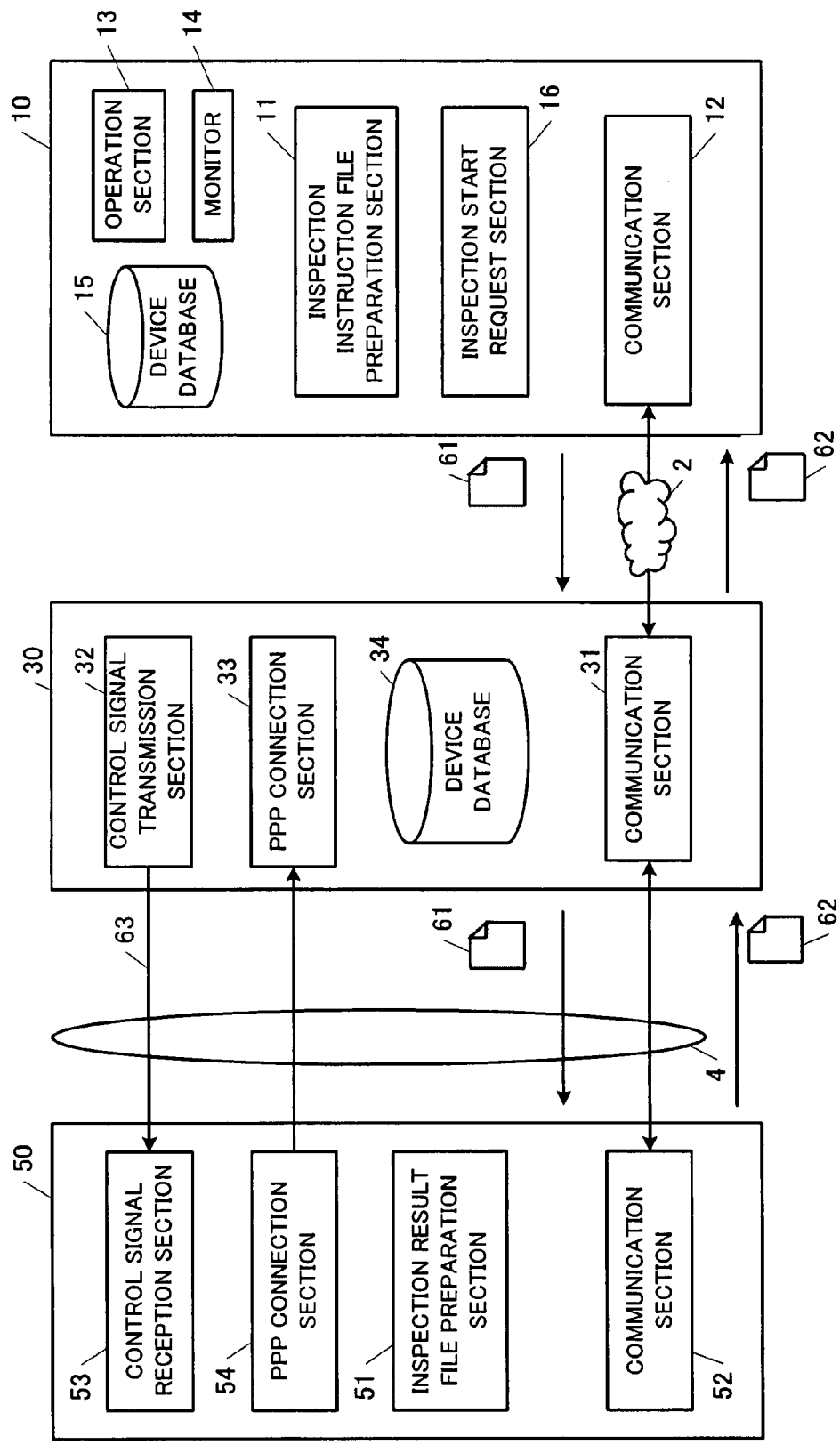
FIG. 2 is a block diagram of each device constituting the remote diagnosis system according to the first embodiment.

FIG. 2 is a functional block diagram of the communication terminal 10, the relay device 30, and the device 50. The communication terminal 10 includes an inspection instruction file preparation section 11, a communication section 12, an operation section 13, a monitor 14, a device database 15, and an inspection start request section 16.

The inspection instruction file preparation section 11 is a processing section for preparing an inspection instruction file 61 in which an inspection item and an inspection instruction command to the device 50 are written. An operator of the communication terminal 10 operates the operation section 13 and gives an instruction to the inspection instruction file preparation section 11, and prepares the inspection instruction file 61. The operator prepares the inspection instruction file 61 while confirming an inspection content displayed on a monitor 14.

The communication section 12 is the processing section for performing transmission/reception of data with another computer by using a protocol such as TCP/IP. The communication section 12 performs transmission/reception of data with the relay device 30 through the Internet 2. Alternately, when the device 50 is connected through a dial-up, the communication section 12 performs transmission/reception of data with the device 50 through the public telephone line network 4.

The device database 15 is a database regarding the devices 50 installed in the factory 5. Specifically, a device name and the IP address are associated with each other and managed therein. A number of devices 50 are installed in the factory 5. The device name and the IP address regarding all of the devices 50 are associated with each other and managed in the device database 15.

The inspection start request section 16 is the processing section for sending the UDP packet to a device 50 being an inspection target, when the inspection of the device 50 is started. As described above, the operator gives an instruction to the inspection instruction file preparation section 11 and prepares the inspection instruction file 61. However, at this time, the operator performs an operation for selecting the device 50 as the inspection target. When this selecting operation is performed, the inspection instruction file preparation section 11 refers to the device database 15, and acquires the IP address of the selected device 50. Then, the inspection instruction file preparation section 11 writes the device name and the IP address of the device 50, or a diagnosis target, in the inspection instruction file 61. Accordingly, by referring to the inspection instruction file 61, the inspection start request section 16 can know the IP address of the device 50, or the diagnosis target, and sends the UDP packet destined for this IP address.

The relay device 30 includes a communication section 31, a control signal transmission section 32, a PPP connection section 33, and a device database 34. The communication section 31 is the processing section for performing transmission/reception of data with another computer by using a protocol such as TCP/IP. The communication section 31 performs transmission/reception of data with the communication terminal 10 through the Internet 2. In addition, when the device 50 is connected through a dial-up, the transmission section 31 performs transmission/reception of data with the device 50 through the public telephone line network 4.

The control signal transmission section 32 is the processing section for transmitting a control signal 63 to the device 50. In this embodiment, the control signal transmission section 32 transmits the control signal 63 to the device 50, by using the public telephone line network 4 and by using a particular frequency band which does not interfere with the data communication. In addition, for example, the control signal 63 may be transmitted through wireless transmission. Alternately, another line other than a telephone line may be used.

Specifically, the control signal 63 transmitted by the control signal transmission section 32 is a connection start demand signal to the device 50. Namely, it is a signal demanding the device 50 which is not connected through a dial-up to make the dial-up connection via the public telephone line network 4.

The PPP connection section 33 is the processing section for receiving a demand for the dial-up connection and an establishment of a PPP (Point to Point) session from the device 50 and making the dial-up connection and establishing the PPP session.

The device database 34 is a database regarding the device 50 installed in the factory 5. Specifically, the device database 34 manages the device name of the device 50, identification information of the device 50 (namely, device identification information designated to be a transmission destination of the control signal 63), and the IP address such that they are corresponded to one another. A number of devices 50 are installed in the factory 5. The device name, the device identification information, and the IP address regarding all of the devices 50 are managed in the device database 34 such that they are corresponded to one another.

The device identification information is the information for specifying the transmission destination to which the control signal transmission section 32 transmits the control signal 63. The information unique to each device 50 is assigned as the device identification information so as to uniquely specify each device 50. A number of devices 50 are installed in the factory 5. Accordingly, the relay device 30 needs to specify the device 50, or the inspection target, and to transmit the control signal 63. Therefore, this device identification information is used. Specifically, the device identification information is embedded in the control signal 63. The device 50 receives the control signal 63 when it identifies that the device identification information is of its own device.

The device name and the IP address of the device 50 are also registered in this device database 34, and this IP address is identical to the IP address registered in the device database 15 of the communication terminal 10. Namely, the relay device 30 reserves the IP address to be assigned to the device 50 that makes the dial-up connection. Namely, it is previously determined which IP address is assigned to which device 50. Then, this correspondence information is reflected on the device database 15 of the communication terminal 10.

The device 50 includes an inspection result file preparation section 51, a communication section 52, a control signal reception section 53, and a PPP connection section 54. The inspection result file preparation section 51 is the processing section for preparing an inspection result file 62 in which the inspection result is described after the inspection on the device 50 is conducted. Specifically, the inspection on the device 50 is conducted based on an inspection item or an inspection instruction command written in the inspection instruction file 61 received from the communication terminal 10, and the result thereof is returned to the communication terminal 10 as the inspection result file 62.

The communication section 52 is the processing section for performing transmission/reception of data with another computer by using a protocol such as TCP/IP. When the device 50 is connected through a dial-up, the communication section 52 performs the transmission/reception of data with the relay device 30 through the public telephone line network 4.

The control signal reception section 53 receives the control signal 63 transmitted from the control signal transmission section 32. When the identification information of its own device is identical to the device identification information included in the control signal 63 thus transmitted, the control signal reception section 53 determines that this control signal 63 is a signal for its own device, and performs reception processing of this control signal 63.

The PPP connection section 54 is the processing section for making a demand for the dial-up connection and an establishment of the PPP session, to the relay device 30. When the control signal 63 identical to the identification information of its own device is received from the relay device 30, the device 50 makes a demand for the dial-up connection and the establishment of the PPP session, to the relay device 30.

Figure 3:
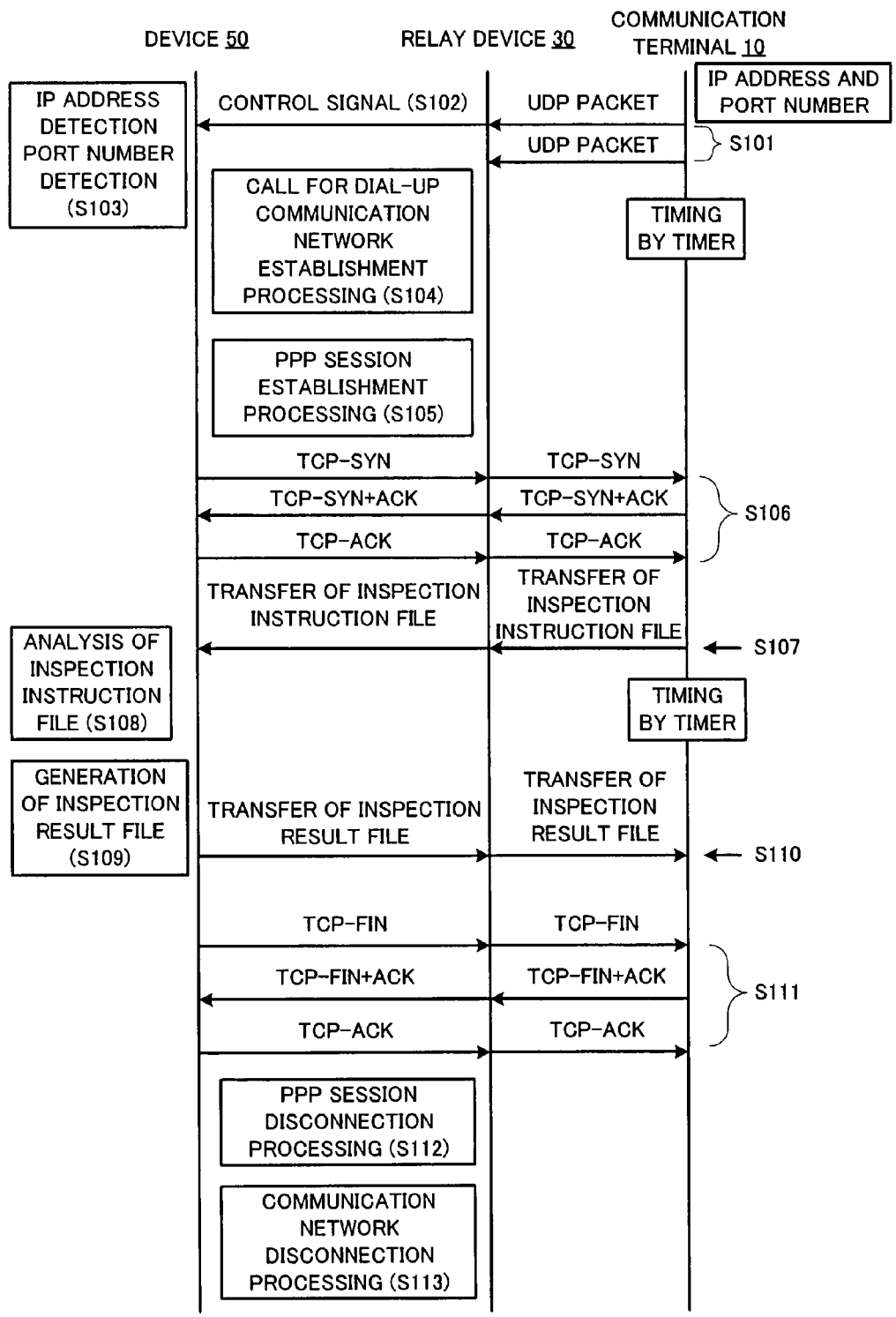
FIG. 3 is a view illustrating an entire processing sequence of the remote diagnosis system according to the first embodiment.

A processing sequence of the aforementioned remote diagnosis system will be described. FIG. 3 is a view illustrating the processing sequence among the communication terminal 10, the relay device 30, and the device 50.

First, the operator operates the communication terminal 10 and gives an instruction to start the inspection. Specifically, the operator operates the operation section 13 and performs an operation for designating the device 50, or the inspection target, and an operation for designating the inspection item. In response to this operation, the inspection instruction file preparation section 11 prepares the inspection instruction file 61. Further, the inspection start request section 16 transmits the UDP packet to the designated device 50 (step S101).

As described above, the inspection start request section 16 can acquire the IP address of the device 50, or the transmission destination, by referring to the inspection instruction file 61, and thus the UDP packet is sent to this IP address. In addition, the inspection start request section 16 designates a port number of a standby TCP port in the UDP packet. A previously defined number may be used as the port number of the standby TCP port.

The inspection start request section 16 sends the UDP packet a plurality of times at a prescribed interval such as one second. When the UDP packet is sent a plurality of times by the inspection start request section 16, the communication terminal 10 starts timing by a timer and transmits to a standby status for the TCP connection.

Next, the UDP packet sent from the communication terminal 10 is intermediately received by the relay device 30. Then, the relay device 30 transmits the control signal 63 to the device 50 corresponding to the IP address of the transmission destination of the UDP packet (step S102). The relay device 30 acquires the IP address of the transmission destination from the UDP packet, and specifies the device 50 to which this IP address is assigned, by referring to the device database 34. In addition, the device identification information of the device 50 can be obtained by referring to the device database 34. Therefore, the relay device 30 transmits the control signal 63 in which the device identification information is designated to each device 50 by using a particular frequency band. Here, the relay device 30 includes in the control signal 63 the information on the IP address and the port number of the communication terminal 10 from which the transmission is performed.

Next, the device 50 having the device identification number identical to the designated device identification number receives the control signal 63. Then, this device 50 acquires the IP address and the port number of the communication terminal 10, or the transmission source, from the received control signal 63 (step S103).

Next, the PPP connection section 54 calls for a dial-up and performs the establishment processing of the dial-up line network. The PPP connection section 33 of the relay device 30 responds to this call, and the dial-up line network is established (step S104). Further, when the PPP connection section 54 makes a demand for the establishment of the PPP session, the PPP session is established between the device 50 and the relay device 30 (step S105).

When the PPP session is established, subsequently, the communication section 52 of the device 50 makes a TCP connection demand to the communication section 12 of the communication terminal 10. Since the IP address and the port number of the communication terminal 10 are acquired in step S103, the communication section 52 makes the TCP connection demand targeting the IP address and the port number. Then, a three-way handshake is performed (step S106), and the TCP connection is established between the device 50 and the communication terminal 10.

In this way, the remote diagnosis system according to this embodiment establishes the PPP session from the device 50 that receives the connection demand by the UDP packet, and subsequently the same device 50 establishes the TCP connection. Therefore, at the point in time when the PPP session is established, the TCP connection can be established instantly.

When the TCP connection is established between the device 50 and the communication terminal 10, the inspection instruction file preparation section 11 transmits the inspection instruction file 61 to the device 50. The inspection instruction file 61 is transmitted to the device 50 through the relay device 30 (step S107).

When the inspection instruction file 61 is received, the device 50 analyzes the content of this file (step S108). Namely, the content of the inspection item or the inspection instruction is analyzed. Then, the inspection is executed in accordance with the inspection item or the inspection instruction command written in the inspection instruction file 61. For example, the number of rotations of the motor in the device 50, a device temperature of the device 50, and a remaining memory capacity of the device 50, etc. are measured. Then, the device 50 prepares the inspection result file 62 in which the result of the conducted inspection is recorded (step S109).

When the inspection result file 62 is prepared, the device 50 transmits the inspection result file 62 to the communication terminal 10 (step S110). At this time, the inspection result file 62 is transmitted using the TCP connection established in step S106. Namely, the transmission result file 62 is returned using the same connection as the TCP connection through which the transmission instruction file 61 is transmitted. When the inspection result file 62 is received, the inspection result is displayed on a monitor 14 in the communication terminal 10.

After transmitting the inspection result file 62, the device 50 makes a TCP disconnection demand to the communication terminal 10. Then, the three-way handshake is performed and the TCP connection is disconnected (step S111).

When the TCP connection between the device 50 and the communication terminal 10 is disconnected, the PPP connection section 54 performs the disconnection processing of the PPP session with the PPP connection section 33 (step S112), and performs the disconnection processing of the dial-up line network (step S113). In this way, after the inspection result file 62 is transmitted, the TCP connection is disconnected, and then the dial-up connection is disconnected.

Figure 4:
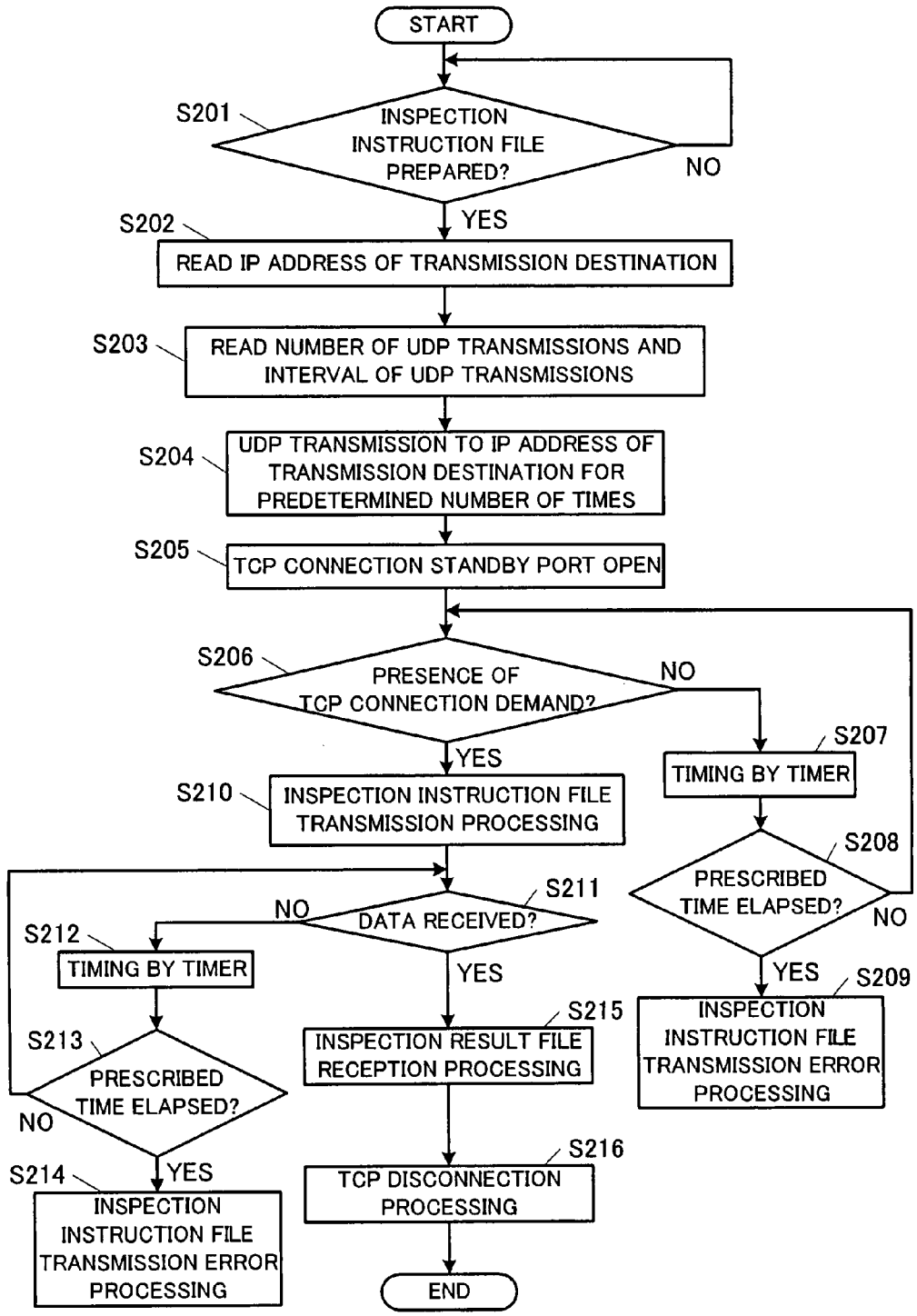
FIG. 4 is a processing flowchart of a communication terminal according to the first embodiment.

Hitherto, the entire processing sequence of the remote diagnosis system including the communication terminal 10, the relay device 30, and the device 50 has been described. Next, the communication terminal 10 is focused on, and a flow of the remote diagnosis processing for the device 50 will be described. FIG. 4 is a flowchart of the remote diagnosis processing in the communication terminal 10.

In the previous stage, the inspection instruction file 61 is prepared by the operation of the operator. The inspection instruction file preparation section 11 refers to the device database 15, acquires the IP address of the device 50, or the diagnosis target designated by the operator, and writes this IP address in the inspection instruction file 61.

In this state, first, the inspection start request section 16 checks whether or not the inspection instruction file 61 is prepared (step S201), and when it is prepared, reads the IP address of the transmission destination, or the diagnosis target, from the inspection instruction file 61 (step S202). Then, the inspection start request section 16 acquires the information of the number of UDP transmissions and an interval of UDP transmissions, from a UDP transmission definition file stored in a storage section not shown (step S203), and in accordance with this information, transmits the UDP packet targeting the IP address acquired in step S202 (step S204). For example, the UDP packet is transmitted five times at an interval of one second, for example.

When the UDP packet is transmitted the predetermined number of times, the communication terminal 10 opens the standby port for the TCP connection, and transmits to the standby status for the TCP connection demand (step S205). In this manner, it is prepared that the TCP connection be established instantly at the point in time when the TCP connection demand is generated from the device 50.

Then, when the TCP connection demand is not received (NO in step S206), timing by a timer is started (step S207), and the TCP connection demand is monitored until a prescribed time elapses (step S208). Then, when the TCP connection demand is not received even if the prescribed time elapsed, a transmission error processing of the inspection instruction file 61 is performed (step S209). For example, a message reading "transmission of the inspection instruction file is failed" is displayed on the monitor 14.

When the TCP connection demand is received in step S206, the inspection instruction file 61 is transmitted to the device 50 after the TCP connection is established (step S210). When the inspection instruction file 61 is transmitted, the communication terminal 10 is set in the standby status as to whether or not data is received (step S211), and when the data is not received, timing by a timer is started (step S212), and the communication terminal 10 is set in the standby status for data reception until a prescribed time elapses (step S213). Then, when the data is not received even if the prescribed time elapsed, a transmission error processing of the inspection instruction file 61 is performed (step S214). For example, the message reading "transmission of the inspection instruction file is failed" is displayed on the monitor 14.

When the data is received in step S211, a reception processing of the inspection result file 62 is performed (step S215). Namely, the reception processing of the inspection result file 62 returned from the device 50 is performed. Next, the disconnection processing of the TCP connection is performed (step S216). The content of the received inspection result recorded in the inspection result file 62 is displayed on the monitor 14, for example. In this way, the communication terminal 10 can obtain the inspection result.

Figure 5:
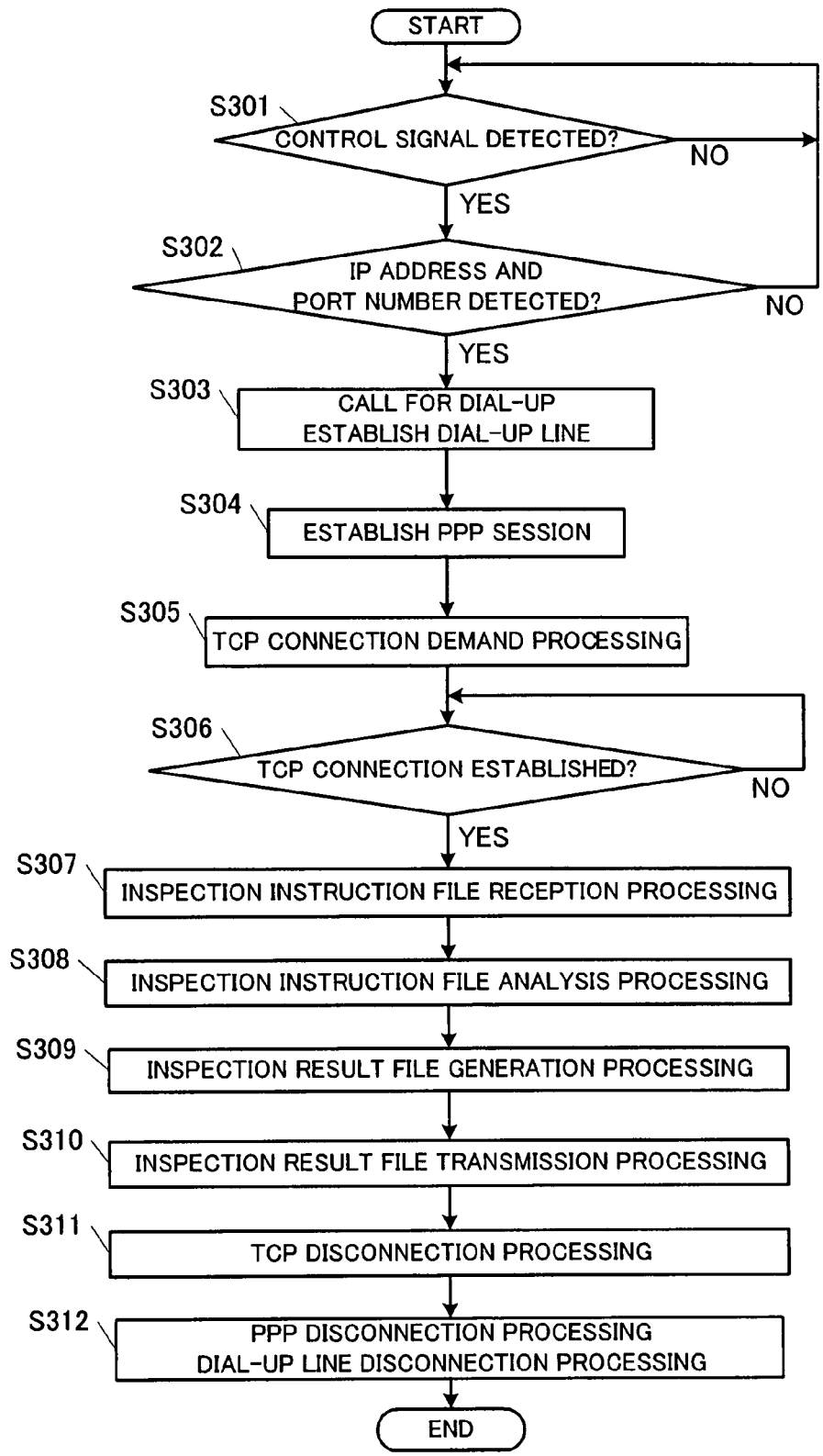
FIG. 5 is a processing flowchart of a device in a factory according to the first embodiment.

FIG. 5 is a processing flowchart of a remote diagnosis focusing on the device 50. The device 50 is set in the standby status for receiving the control signal 63 from the relay device 30 (step S301). When the control signal 63 is received, it is checked whether or not the IP address and the port number are included in the control signal 63 (step S302). This IP address is the IP address of the communication terminal 10, or the transmission source of the inspection instruction file 61, and the port number is the number of the port at which the communication terminal 10 stands by for the TCP connection demand. When the IP address and the port number are not included, the signal is a control signal for another processing. Therefore, the device 50 executes the another processing (not shown), and is set in the standby status for receiving the control signal 63.

When the IP address and the port number are included in the control signal 63, the PPP connection section 54 calls for a dial-up to the PPP connection section 33 of the relay device 30, to establish the dial-up line network (step S303). Then, the PPP session is established on the dial-up connection (step S304).

Subsequently, the communication section 52 makes the TCP connection demand to the communication terminal 10 by using the IP address and the port number acquired in step S302 (step S305), and is set in a standby status for the establishment of the TCP connection (step S306), and when the TCP connection is established, performs the reception processing of the inspection instruction file 61 (step S307).

When the inspection instruction file 61 is received, the inspection item or the inspection instruction command written in the inspection instruction file 61 is analyzed (step S308), and the inspection is conducted in accordance with this inspection item or the inspection instruction command. After the inspection is conducted, the inspection result file 62 in which the inspection result is written is prepared (step S309), and the inspection result file 62 is transmitted to the communication terminal 10 (step S310). Namely, the inspection result file 62 is returned using the TCP connection used in transferring the inspection instruction file 61 as it is.

When the transmission of the inspection result file 62 is finished, the disconnection processing of the TCP connection is performed (step S311), and the disconnection processing of the PPP session is performed, and finally, the disconnection of the dial-up line network is performed (step S312).

In this way, according to the remote diagnosis system of this embodiment, when the inspection is started, the UDP packet is sent from the communication terminal 10 on the side of transmitting the inspection instruction file 61. Then, the communication terminal 10 that transmits the UDP packet is set in the standby status for the TCP connection. Then, the demands for the connection of the dial-up line and for the TCP connection are made from the device 50 that receives the control signal 63 transmitted based on the UDP packet. Accordingly, at the point in time when the device 50 establishes the line network through the dial-up connection, the TCP connection can be established instantly.

Figure 6:
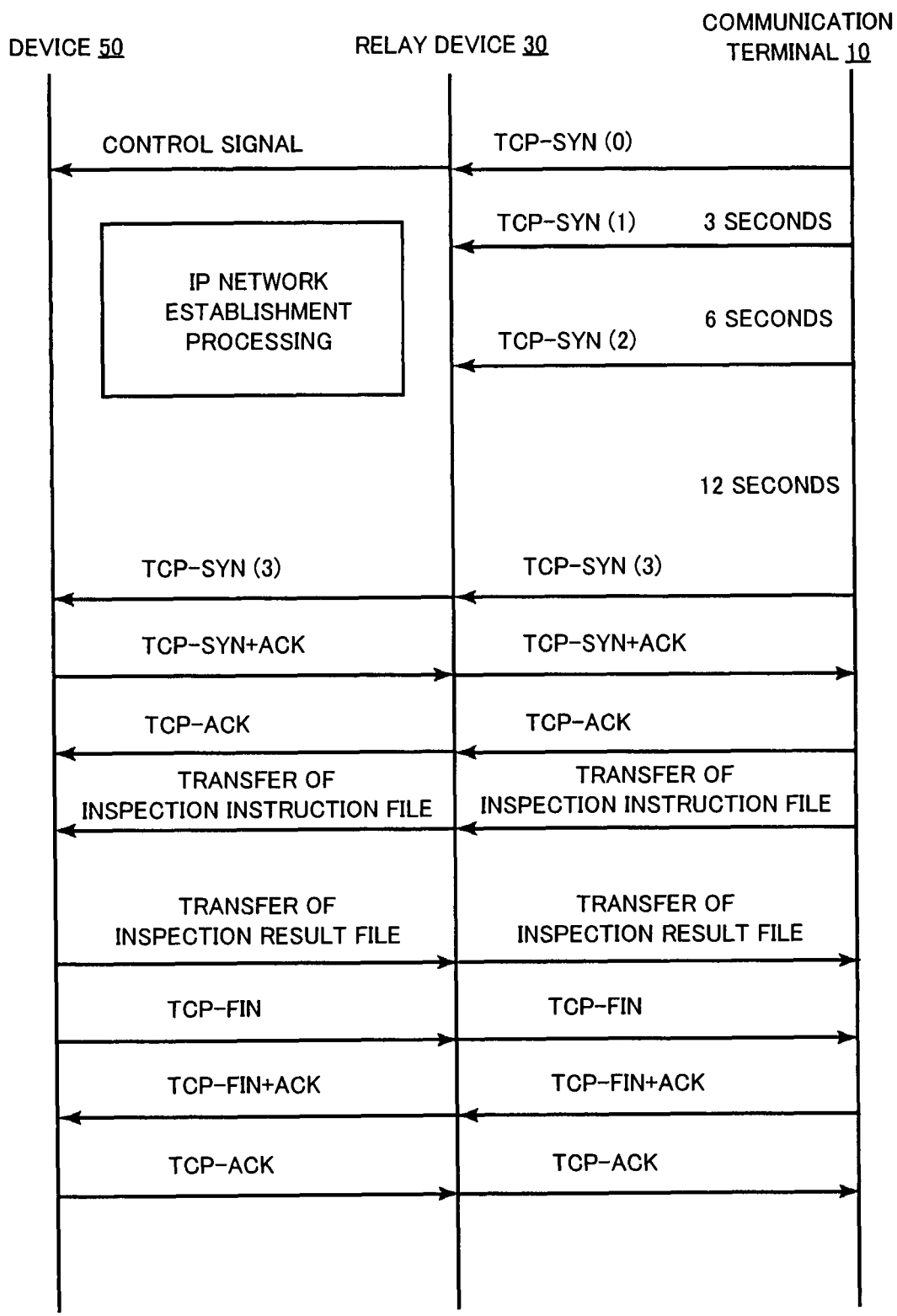
FIG. 6 is a view illustrating a processing sequence according to the first embodiment where a TCP packet is used.

For example, as shown in FIG. 6, it is possible to consider another method in which the communication terminal 10 transmits not the UDP packet but a TCP-SYN packet. Namely, the UDP packet in this embodiment is replaced with the TCP-SYN packet. Specifically, when the TCP-SYN packet from the communication terminal 10 is received, the relay device 30 transmits the control signal 63 to the device 50. Then, the device 50 that has received the control signal 63 makes the dial-up connection with the relay device 30. When the device 50 is connected through the dial-up and the PPP session is established, the device 50 responds to the TCP connection demand sent from the communication terminal 10 and establishes the TCP connection at that point in time.

However, in this case, the communication terminal 10 re-transmits the TCP-SYN packet until an ACK packet for the TCP connection is received. According to a specification of the TCP, the waiting time for the reception of an acknowledgment response is exponentially increased, for example, by two times, and then four times, in a re-transmission processing of the TCP. Accordingly, the communication terminal 10 is controlled as follows. When there is no response to the first TCP-SYN packet (TCP-SYN(0) in the figure), the second TCP-SYN packet (TCP-SYN(1)) is re-transmitted after waiting for three seconds, for example. When there is no response, the TCP-SYN(2) packet is re-transmitted after waiting for six seconds. Next, the TCP-SYN(3) is re-transmitted after waiting for twelve seconds.

Accordingly, the TCP connection is not established until a re-transmission timing of the TCP-SYN packet arrives, even after the device 50 is connected through the dial-up and the PPP session is established. For example, as shown in FIG. 6, it is assumed that the control signal 63 is actually transmitted to the device 50 by the first TCP-SYN(0). Then, it is assumed that, just after the third TCP-SYN(2) is transmitted, the establishment of the PPP session is completed. In this case also, the three-way handshake is finally performed after the fourth TCP-SYN(3) is transmitted after twelve seconds, and the TCP connection is established. Therefore, the establishment of the TCP connection is delayed.

Meanwhile, according to the remote diagnosis system of this embodiment, upon the arrival of the UDP packet at the relay device 30, the control signal 63 is transmitted to the device 50, and the dial-up connection, the establishment of the PPP session, and the establishment of the TCP connection are sequentially performed from the device 50, thus making it possible to establish the TCP connection promptly. Namely, at the point in time when the PPP session is established, the processing can be promptly moved to the TCP connection processing. Thus, in the remote diagnosis system according to this embodiment, when the operator gives a start instruction of the inspection, the inspection result can be obtained in quick response.

In addition, as shown in FIG. 6, when the inspection start request is made by using the TCP packet, there is a problem that the re-transmission of the TCP packet is performed, thus complicating the control. However, in this embodiment, since the UDP packet is used, the re-transmission processing is not performed and the control is not made complicated, thus making it possible to surely send the control signal 63 to the device 50. Further, since the UDP packet can be transmitted at an arbitrary interval, the control is easily performed.

Hitherto, the first embodiment of the present invention has been described. However, the connection between the relay device 30 and the device 50 is not limited to the telephone line, but may be a wireless network. Namely, the present invention can generally be applied to a network in which the connection between the device 50 and the relay device 30 are non-continuous connection and the line can be established only from the device 50. In addition, the present invention can be applied under a condition that the connection between the communication terminal 10 and the relay device 30 is the continuous connection and an exclusive line can be used in addition to the Internet.

Figure 7:
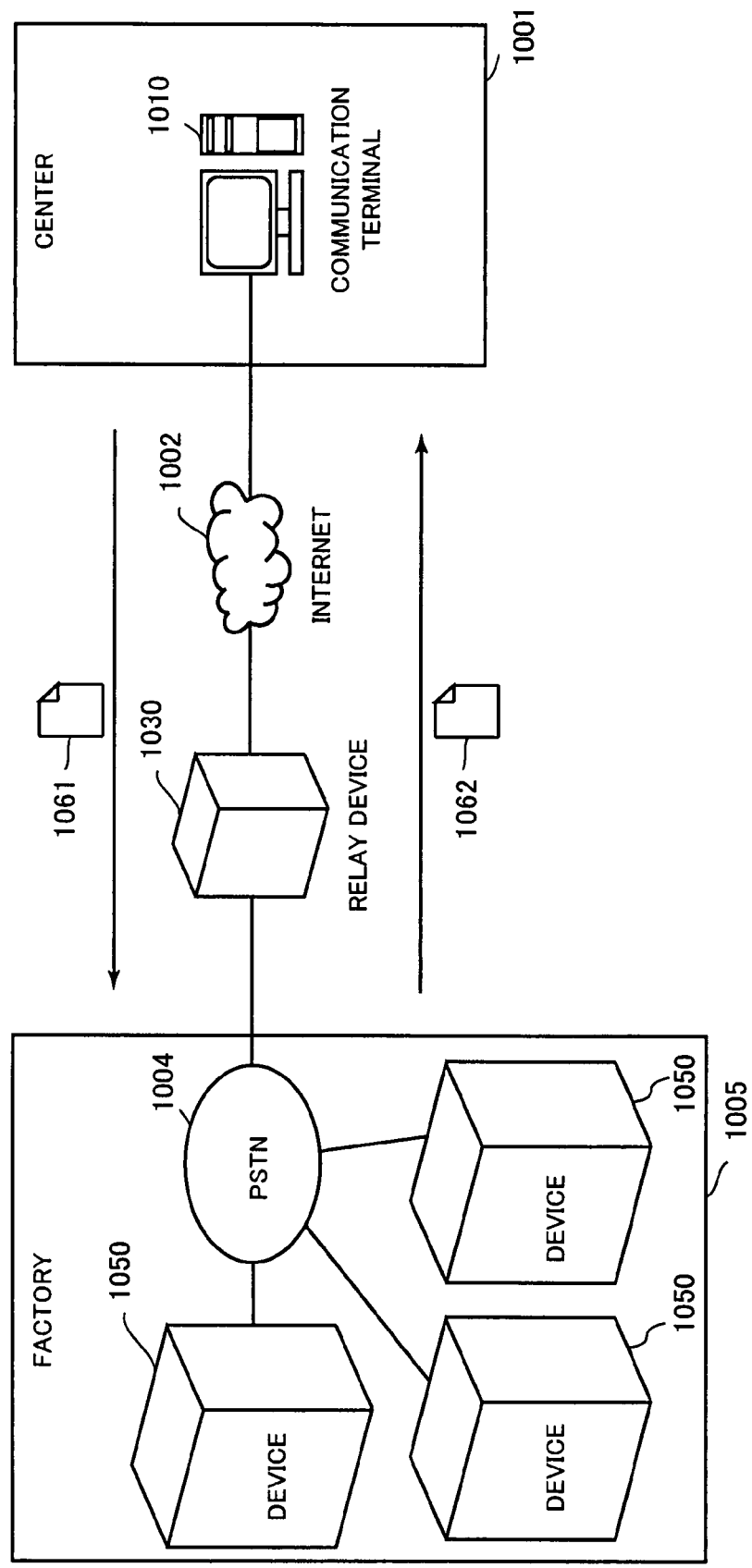
FIG. 7 is a block diagram illustrating a system configuration of a remote diagnosis system according to a second embodiment.

(Second embodiment) A second embodiment of the present invention will be described hereunder with reference to the drawings. FIG. 7 is a block diagram illustrating a system configuration of the remote diagnosis system according to this embodiment. This remote diagnosis system includes a communication terminal 110 installed in a center 1001; a relay device 1030; and devices 1050 installed in a factory 1005. The communication terminal 1010 and the relay device 1030 are connected through the Internet 1002. In addition, the relay device 1030 and each device 1050 are connected through a public telephone line network 1004.

This remote diagnosis system is a system for remotely conducting a diagnosis on the device 1050 in the factory 1005 from the center 1001 at a distant place. Specifically, an inspection instruction file 1061 is transmitted to the device 1050 through a network from the communication terminal 1010 at the center 1001, and a result of the inspection conducted on the device 1050 is returned as an inspection result file 1062 to the communication terminal 1010 from the device 1050 through the network. Thus, a diagnosis on the condition of the device 1050 in the factory 1005 can be made in the center 1001 at a distant place.

Here, the communication terminal 1010 and the relay device 1030 are continuously connected to the Internet 1002. Namely, fixed IP addresses are assigned to the communication terminal 1010 and the relay device 1003. Accordingly, when the necessity for performing communication occurs, the communication terminal 1010 and the relay device 1030 can establish the TCP connection by sending a TCP connection demand from either of the terminals (devices).

Meanwhile, the relay device 1030 and each device 1050 are connected through the public telephone line network 1004 physically. However, by making a dial-up connection to the relay device 1030 from the device 1050, a communicable condition is achieved for the first time. Conversely, the dial-up connection cannot be made to the device 1050 from the relay device 1030. Namely, in order to perform the communication between the relay device 1030 and the device 1050, the dial-up connection needs to be made from the device 1050.

Figure 8:
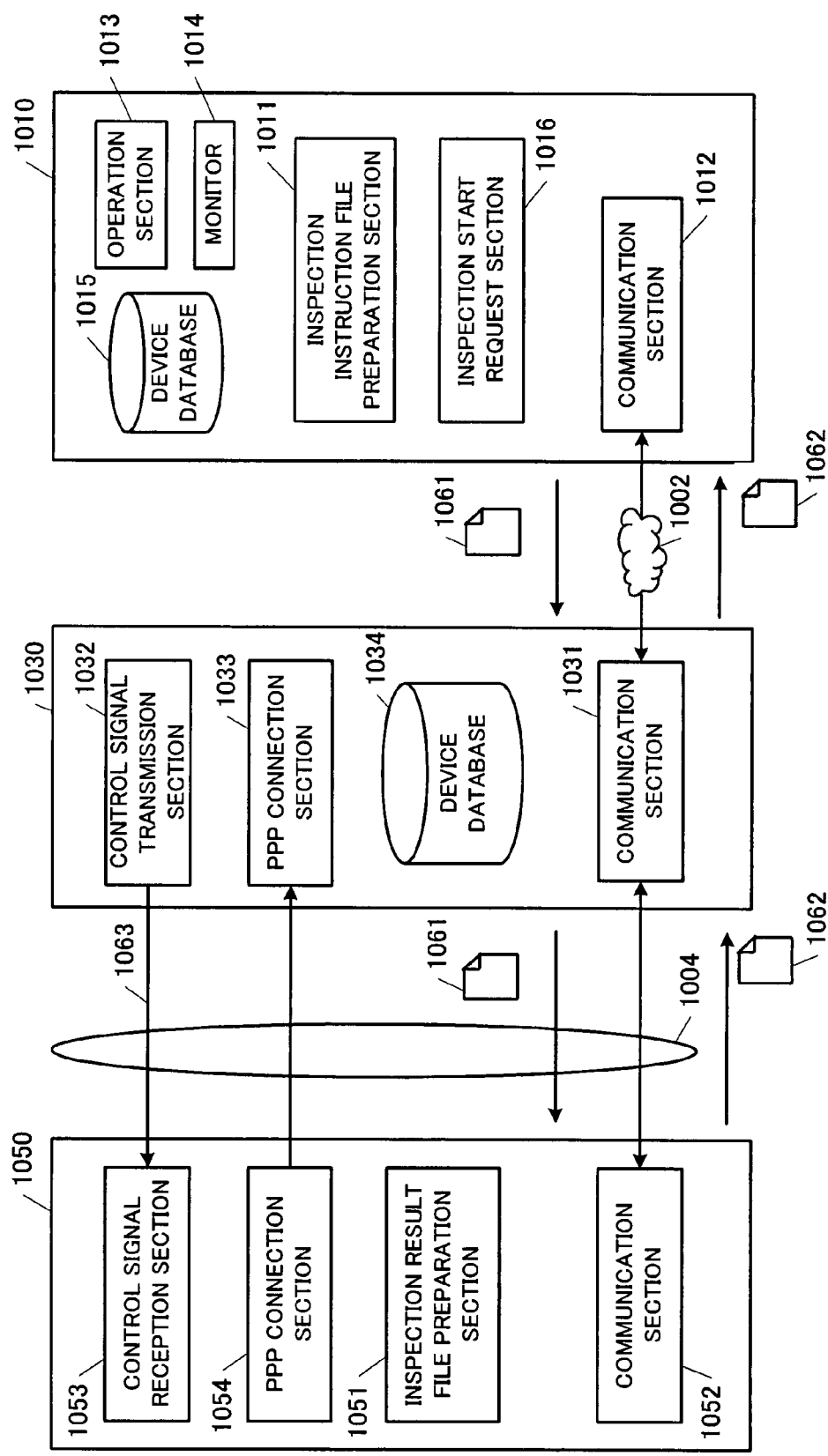
FIG. 8 is a block diagram of each device constituting the remote diagnosis system according to the second embodiment.

FIG. 8 is a functional block diagram of the communication terminal 1010, the relay device 1030, and the device 1050. The communication terminal 1010 includes an inspection instruction file preparation section 1011, a communication section 1012, an operation section 1013, a monitor 1014, a device database 1015, and an inspection start request section 1016.

The inspection instruction file preparation section 1011 is the processing section for preparing an inspection instruction file 1061 in which an inspection item and an inspection instruction command to the device 1050 are written. In addition, the inspection instruction file preparation section 1011 performs the processing of setting reply mode information in a header of the inspection instruction file 1061. The operator of the communication terminal 1010 operates the operation section 1013, gives an instruction to the inspection instruction file preparation section 1011, and prepares the inspection instruction file 1061. The operator prepares the inspection instruction file 1061 while confirming the inspection content displayed on the monitor 1014.

The reply mode is a mode for returning the inspection result file 1062 to the communication terminal 1010 by the device 1050. This mode includes an interactive mode and a batch mode. In the interactive mode, the device 1050 transmits the inspection result file 1062, keeping the TCP connection used for receiving the inspection instruction file 1061 as it is. In the batch mode, the device 1050 disconnects the TCP connection used for receiving the inspection instruction file 1061, and establishes another TCP connection and transmits the inspection result file 1062. More specifically, in the batch mode, after receiving the inspection instruction file 1061, the device 1050 disconnects the dial-up connection once. Then, when the transmission of the inspection result file 1062 is prepared, the device 1050 makes the dial-up connection again, further establishes a new TCP connection, and transmits the inspection result file 1062.

The communication section 1012 is the processing section for performing transmission/reception of data with another computer by using a protocol such as TCP/IP. The communication section 1012 performs transmission/reception of data with the relay device 1030 through the Internet 1002. Alternately, when the device 1050 is connected through a dial-up, the communication section 1012 transmits/receives data with the device 1050 through the Internet 1002 and the public telephone line network 1004.

The device database 1015 is a database regarding the devices 1050 installed in the factory 1005. Specifically, the database 1015 manages the device name and the IP address of the device 1050 in such a manner that they are corresponded to each other. A number of devices 1050 are installed in the factory 1005. In the device database 1015, the device name and the IP address regarding all of the devices 1050 are managed in such a manner that they are corresponded to each other.

The inspection start request section 1016 is the processing section for sending a UDP packet to the device 1050, or an inspection target, when the inspection on the device 1050 is started. As described above, the operator gives an instruction to the inspection instruction file preparation section 1011 and prepares the inspection instruction file 1061. At this time, the operator performs the operation for selecting the device 1050, or the inspection target. When this selection operation is performed, the inspection instruction file preparation section 1011 refers to the device database 1015 and acquires the IP address of the selected device 1050. Then, the inspection instruction file preparation section 1011 writes the device name and the IP address of the device 1050, or an diagnosis target, in the inspection instruction file 1061. Accordingly, the inspection start request section 1016 can know the IP address of the device 1050, or the diagnosis target, by referring to the inspection instruction file 1061, and sends the UDP packet destined to this IP address.

The relay device 1030 includes a communication section 1031, a control signal transmission section 1032, a PPP connection section 1033, and a device database 1034. The communication section 1031 is the processing section for performing transmission/reception of data with another computer, by using a protocol such as TCP/IP. The communication section 1031 transmits/receives data with the communication terminal 1010 through the Internet 1002. In addition, when the device 1050 is connected through a dial-up, the communication section 1031 performs transmission/reception of data with the device 1050 through the public telephone line network 1004.

The control signal transmission section 1032 is the processing section for transmitting a control signal 1063 to the device 1050. In this embodiment, the control signal transmission section 1032 transmits the control signal 1063 to the device 1050 through the public telephone line network 1004, using a particular frequency band which does not interfere with the data communication. In addition, for example, the control signal 1063 may be transmitted through wireless transmission. Alternately, a line other than the telephone line may be used.

Specifically, the control signal 1063 transmitted by the control signal transmission section 1032 is a connection start request signal to the device 1050. Namely, this is a signal demanding a dial-up connection to the device 1050 which is not connected through the dial-up via the public telephone line network 1004.

The PPP connection section 1033 is the processing section for receiving a demand for a dial-up connection and the establishment of a PPP (Point to point) session from the device 1050, and making the dial-up connection and the establishment of the PPP session.

The device database 1034 is the database regarding the device 1050 installed in the factory 1005. Specifically, the device database 1034 manages the device name of the device 1050, the identification information of the device 1050 (namely, the device identification information designated as the transmission destination of the control signal 1063) and the IP address, in such a manner that they are corresponded to one another. A number of devices 1050 are installed in the factory 1005. In the device database 1034, the device name, the device identification information, and the IP address regarding all of the devices 1050 are managed in such a manner that they are corresponded to one another.

The device identification information is the information for specifying the transmission destination to which the control signal transmission section 1032 transmits the control signal 1063. As the device identification information, unique information is assigned to each device 1050 so as to uniquely specify each device 1050. A number of devices 1050 are installed in the factory 1005. Therefore, the relay device 1030 needs to specify the device 1050, or the inspection target, and transmit the control signal 1063. Hence, this device identification information is used. Specifically, the device identification information is embedded in the control signal 1063. The device 1050 that has received the connection demand receives the control signal 1063 when it identifies that the device identification information is of its own device.

The device name and the IP address of the device 1050 are also registered in this device database 1034, and this IP address is identical to the IP address registered in the device database 1015 of the communication terminal 1010. Namely, the relay device 1030 reserves the IP address to be assigned to the device 1050 that makes the dial-up connection. Namely, it is previously determined which IP address is assigned to which device 1050. Then, this correspondence information is reflected on the device database 1015 of the communication terminal 1010.

The device 1050 includes an inspection result file preparation section 1051, a communication section 1052, a control signal reception section 1053, and a PPP connection section 1054. The inspection result file preparation section 1051 is the processing section for preparing the inspection result file 1062 in which the inspection result is described, after the inspection is conducted on the device 1050. Specifically, the inspection on the device 1050 is conducted based on the inspection item or the inspection instruction command written in the inspection instruction file 1061 received from the communication terminal 1010, and the result thereof is returned to the communication terminal 1010 as the inspection result file 1062.

The communication section 1052 is the processing section for performing transmission/reception of data with another computer, by using a protocol such as TCP/IP. When the device 1050 is connected through a dial-up, the communication section 1052 performs the transmission/reception of data with the relay device 1030 through the public telephone line network 1004.

The control signal reception section 1053 receives the control signal 1063 transmitted from the control signal transmission section 1032. When the identification information of its own device is identical to the device identification information included in the transmitted control signal 1063, the control signal reception section 1053 determines that this control signal 1063 is the signal for its own device, and performs the reception processing of this control signal 1063.

The PPP connection section 1054 is the processing section for making the demand for the dial-up connection and the establishment of the PPP session, to the relay device 1030.

When the control signal 1063 identical to the identification information of its own device is received from the relay device 1030, the device 1050 makes the demand for the dial-up connection and establishment of the PPP session, to the relay device 1030.

Figure 9:
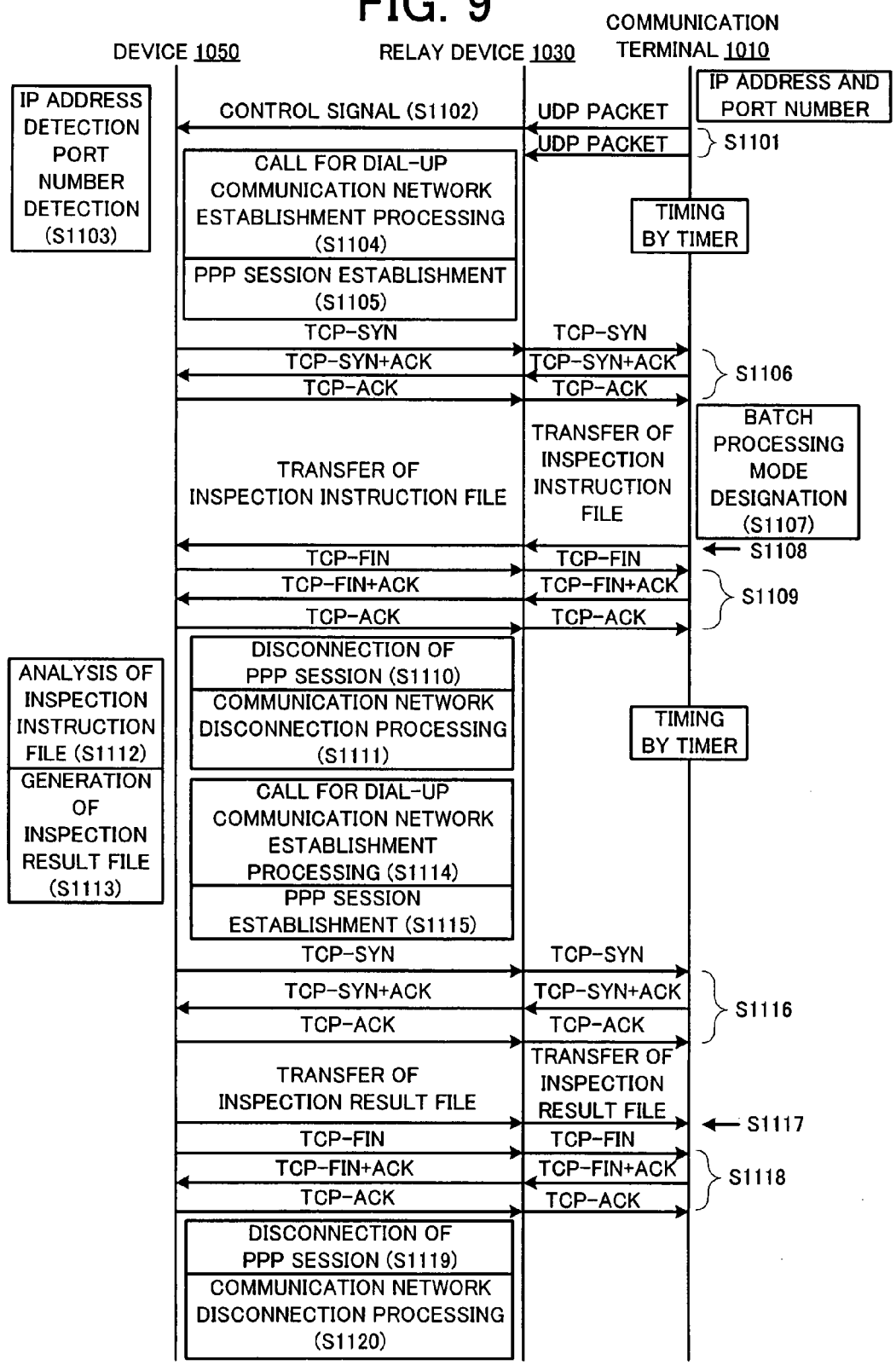
FIG. 9 is a view illustrating an entire processing sequence in batch mode of the remote diagnosis system according to the second embodiment.
Figure 10:
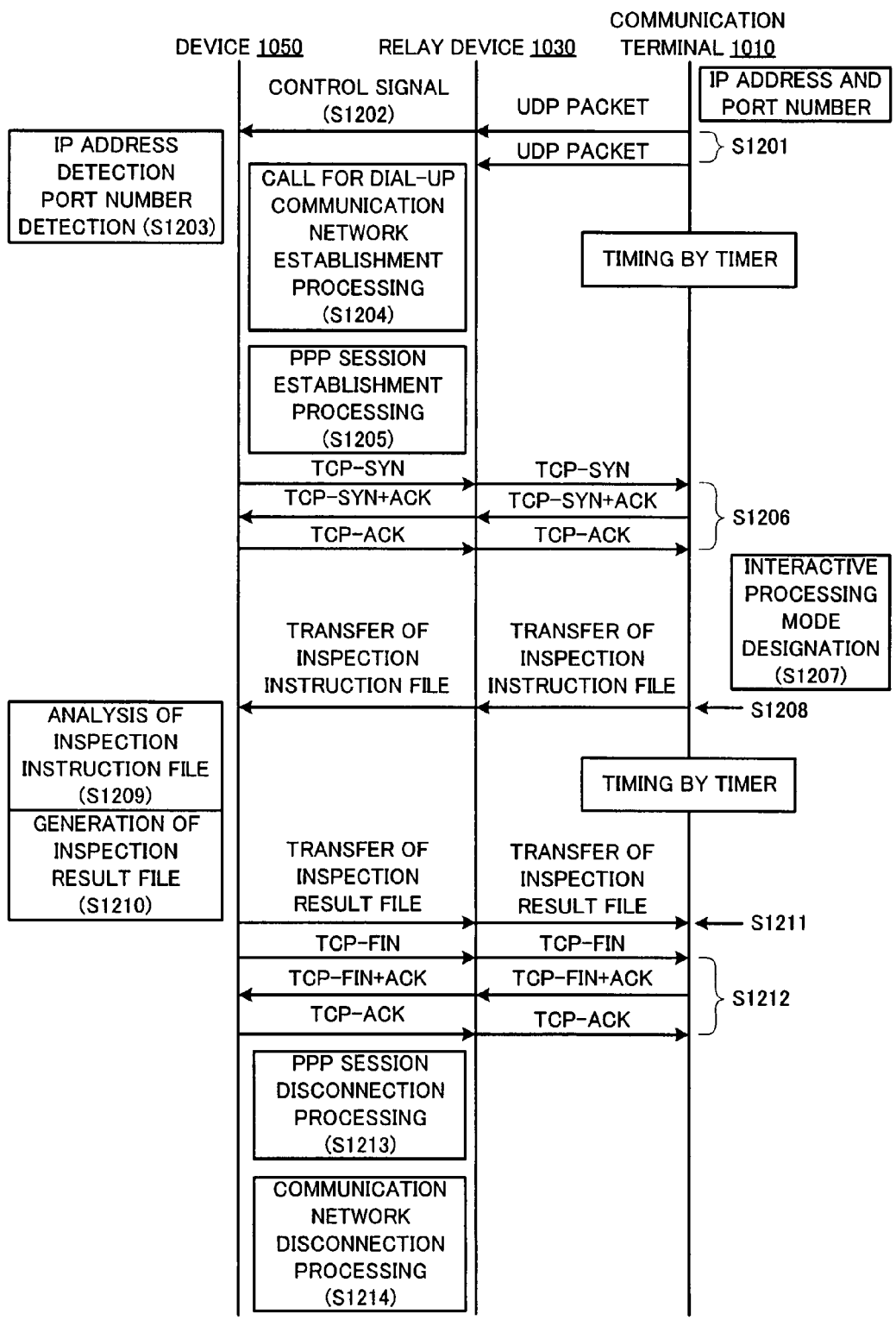
FIG. 10 is a view illustrating an entire processing sequence in interactive mode of the remote diagnosis system according to the second embodiment.

The processing sequence of the remote diagnosis system as described above will be explained. FIGS. 9 and 10 are views illustrating the processing sequence among the communication terminal 1010, the relay device 1030, and the device 1050. FIG. 9 illustrates the processing sequence when the batch mode is designated by the communication terminal 1010 as the reply mode. FIG. 10 is the processing sequence when the interactive mode is designated by the communication terminal 1010 as the reply mode.

The processing sequence at the time of the batch mode in FIG. 9 will be described first. First, the operator operates the communication terminal 1010, and gives an instruction to start the inspection. Specifically, the operator operates the operation section 1013 and performs the operation for designating a device 1050, or an inspection target, and the operation for designating an inspection item. In response to these operations, the inspection instruction file preparation section 1011 prepares the inspection instruction file 1061. In addition, when the inspection item is designated, a reply mode is set in accordance with this inspection item. Alternately, the operator may designate the reply mode expressly. Further, the inspection start request section 1016 transmits a UDP packet to the designated device 1050 (step S1101).

As described above, the inspection start request section 1016 can acquire the IP address of the device 1050, or the transmission destination, by referring to the inspection instruction file 1061, and therefore the UDP packet is sent to this IP address. In addition, the inspection start request section 1016 designates the port number of the standby TCP port in the UDP packet. The previously defined number may be used as the port number of the standby TCP port.

The inspection start request section 1016 sends the UDP packet a plurality of times at a prescribed interval such as one second interval. After the UDP packet is sent a prescribed number of times by the inspection start request section 1016, the communication terminal 1010 starts timing by a timer, and transmits to the standby status for the TCP connection.

Next, the UDP packet sent from the communication terminal 1010 is intermediately received by the relay device 1030. Then, the relay device 1030 transmits the control signal 1063 to the device 50 corresponding to the IP address of the transmission destination of the UDP packet (step S1102). The relay device 1030 acquires the IP address of the transmission destination from the UDP packet, and by referring to the device database 1034, the relay device 1030 can specify the device 1050 to which the IP address is assigned. Moreover, by referring to the device database 1034, the relay device 1030 can obtain the device identification information of the device 1050. Then, the relay device 1030 transmits to each device 1050 the control signal 1063 designating the device identification information, by using a particular frequency band. Here, the relay device 1030 is adapted to include the information of the IP address and the port number of the communication terminal 1010, or the transmission source.

Next, the device 1050 having the device identification number identical to the designated device identification number receives the control signal 1063. Then, the device 1050 acquires the IP address and the port number of the communication terminal 1010, or the transmission source, from the received control signal 1063 (step S1103).

Next, the PPP connection section 1054 performs the establishment processing of the dial-up line network by originating a call for dial-up. The PPP connection section 1033 of the relay device 1030 responds to this call and the dial-up line network is established (step S1104). Further, when the PPP connection section 1054 makes a demand for establishment of a PPP session, the PPP session is established between the device 1050 and the relay device 1030 (step S1105).

When the PPP session is established, subsequently, the communication section 1052 of the device 1050 makes a demand for a TCP connection, to the communication section 1012 of the communication terminal 1010. In step S1103, since the communication section 1052 acquires the IP address and the port number of the communication terminal 1010, the communication section 1052 makes the TCP connection demand targeting the IP address and the port number. Then, a three-way handshake is performed (step S1106), and the TCP connection is established between the device 1050 and the communication terminal 1010.

In this way, the remote diagnosis system according to this embodiment establishes the PPP session from the device 1050 that receives the connection demand by the UDP packet, and subsequently the same device 1050 establishes the TCP connection. Therefore, at the point in time when the PPP session is established, the TCP connection can be established instantly.

When the TCP connection is established between the device 1050 and the communication terminal 1010, the inspection instruction file preparation section 1011 sets reply mode information in the header of the inspection instruction file 1061. Here, the batch mode is designated (step S1107). The inspection instruction file 1061 is transmitted to the device 1050 via the relay device 1030 (step S1108).

When the inspection instruction file 1061 is received, the device 1050 acquires the reply mode information from the header of the inspection instruction file 1061. Here, since the batch mode is designated, the device 1050 transmits a TCP disconnection demand to the communication terminal 1010. Then, a three-way handshake is performed, and the TCP connection between the device 1050 and the communication terminal 1010 is disconnected (step S1109).

When the TCP connection between the device 1050 and the communication terminal 1010 is disconnected, the PPP connection section 1054 performs a disconnection processing of the PPP session with the PPP connection section 1033 (step S1110), and performs the disconnection processing of the dial-up line network (step S1111). In this way, after receiving the inspection instruction file 1061, the device 1050 disconnects the TCP connection and the dial-up connection once.

Next, the device 1050 analyzes the content of the inspection instruction file 1061 (step S1112). Namely, the device 1050 analyzes the content of the inspection instruction item or the inspection instruction command. Then, the device 1050 conducts the inspection in accordance with the inspection item or the inspection instruction command written in the inspection instruction file 1061. For example, the number of rotations of the motor of the device 1050, the device temperature of the device 1050, and the remaining memory capacity of the device 1050, etc. are measured. Then, the device 1050 prepares the inspection result file 1062 in which the result of the conducted inspection is recorded (step S1113).

When the transmission of the inspection result file 1062 is prepared, the device 1050 performs the establishment of the TCP connection with the communication terminal 1010 again. Specifically, when the inspection result file 1062 is prepared, the PPP connection demand section 1054 originates a call for a dial-up again and establishes the dial-up line network (step S1114), and further the PPP session is established between the device 1050 and the relay device 1030 (step S1115). Namely, after preparing the inspection result file 1062, the device 1050 makes the dial-up connection by originating the call for dial-up on its own, without receiving the control signal 1063.

Subsequently, the device 1050 makes a TCP connection demand to the communication terminal 1010, performs a three-way handshake, and establishes the TCP connection (step S1116). In this way, when a new TCP connection is established, the device 1050 transmits the inspection result file 1062 to the communication terminal 1010 using the newly established TCP connection (step S1117). In the communication terminal 1010, when the inspection result file 1062 is received, the inspection result is displayed on the monitor 1014.

After transmitting the inspection result file 1062, the device 1050 makes a TCP disconnection demand to the communication terminal 1010. Then, a three-way handshake is performed and the TCP connection is disconnected (step S1118).

When the TCP connection between the device 1050 and the communication terminal 1010 is disconnected, the PPP connection section 1054 performs the disconnection processing of the PPP session with the PPP connection section 1033 (step S1119), and performs the disconnection processing of the dial-up line network (step S1120). In this way, after the inspection result file 1062 is transmitted, the TCP connection is disconnected, and further the dial-up connection is disconnected. As to the inspection item for which a long processing time is required, by using the batch mode, it is thus possible to obviate the problem such as a disconnection of the line during the communication, and the processing can be finished under a normal condition.

Subsequently, the processing sequence of the interactive mode will be described with reference to FIG. 10. In FIG. 10, steps S1201 to S1206 are the same as the steps S1101 to S1106 as shown in FIG. 9. Namely, by performing the steps S1201 to S1206, the TCP connection is established between the device 1050 and the communication terminal 1010.

Next, the inspection instruction file preparation section 1011 sets the reply mode information in the inspection instruction file 1061. Here, the interactive mode is designated (step S1207). The inspection instruction file 1061 is transmitted to the device 1050 via the relay device 1030 (step S1208).

When the inspection instruction file 1061 is received, the device 1050 acquires the reply mode information from the header of the inspection instruction file 1061. Here, since the interactive mode is designated, the device 1050 analyzes the content of the inspection instruction file 1061 while maintaining the TCP connection (step S1209), and conducts the inspection in accordance with the inspection item or the inspection instruction command written in the inspection instruction file 1061. Then, the device 1050 prepares the inspection result file 1062 in which the result of the conducted inspection is recorded (step S1210).

When the inspection result file 1062 is prepared, the device 1050 transmits the inspection result file 1062 to the communication terminal 1010 while maintaining the already established TCP connection (step S1211). Namely, the TCP connection used for receiving the inspection instruction file 1061 is maintained as it is, whereupon the inspection result file 1062 is transmitted. In the communication terminal 1010, when the inspection result file 1062 is received, the inspection result is displayed on the monitor 1014. Thus, as to the inspection item for which a short processing time is required, by using the interactive mode, the response can be obtained in a short time with the TCP connection maintained.

After the inspection result file 1062 is transmitted, the device 1050 makes a TCP disconnection demand to the communication terminal 1010. Then, a three-way handshake is performed, and the TCP connection is disconnected (step S1212). Further, the PPP session disconnection processing is performed (step S1213), and the disconnection processing of the dial-up line network is performed (step S1120). In this way, after the inspection result file 1062 is transmitted, the TCP connection is disconnected, and further the dial-up is disconnected.

Figure 11:
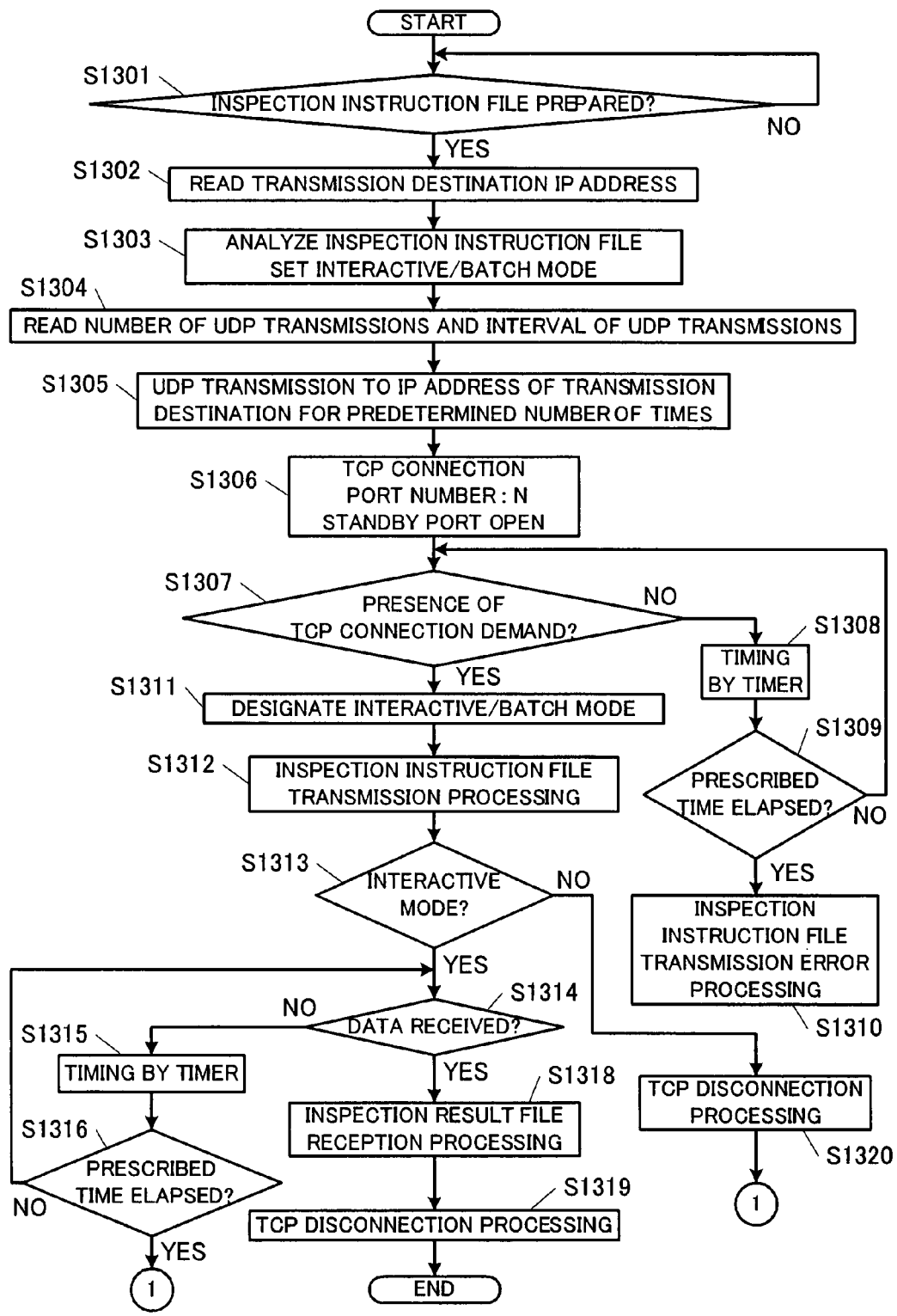
FIG. 11 is a processing flowchart of the communication terminal according to the second embodiment.
Figure 12:
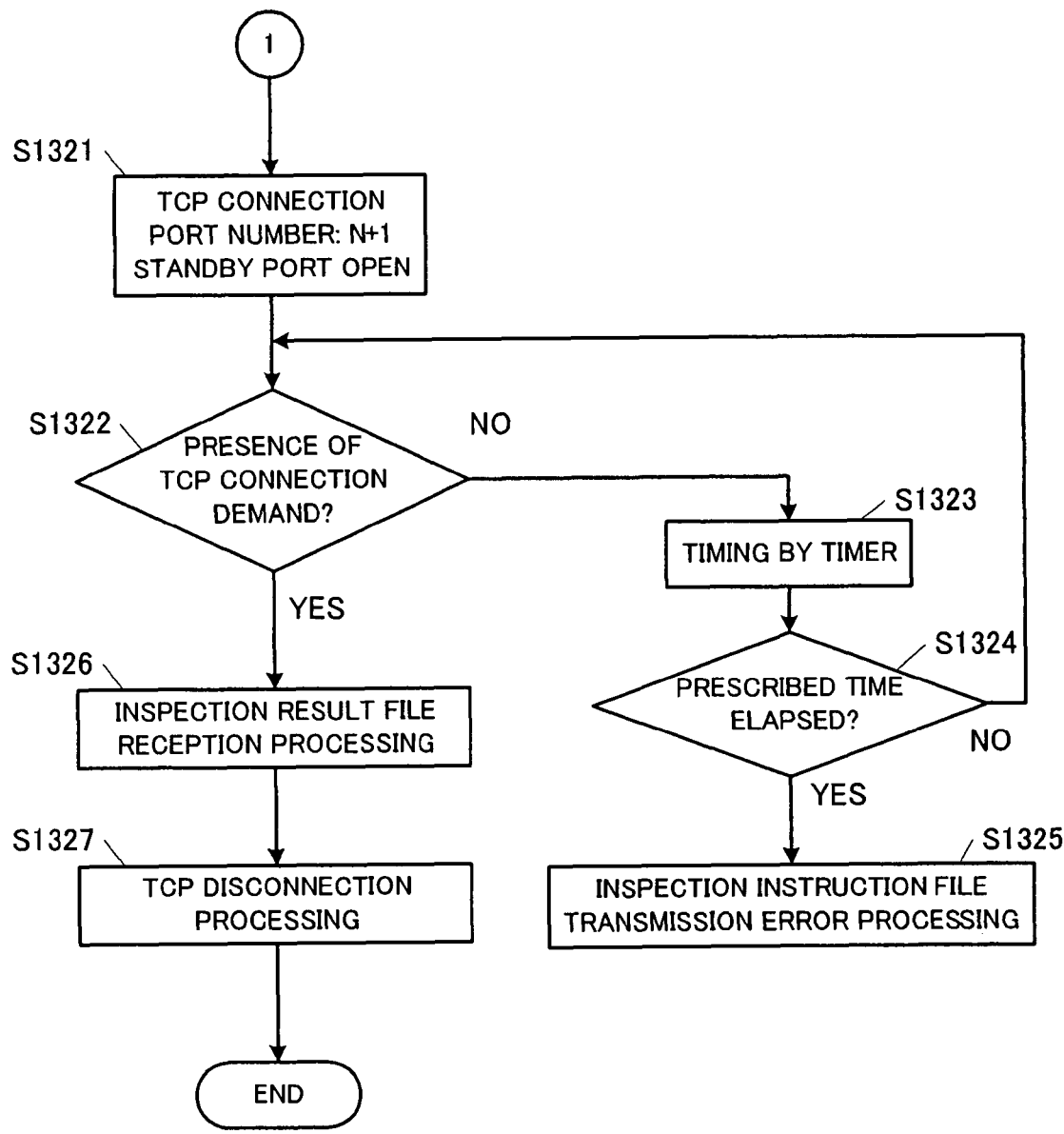
FIG. 12 is a processing flowchart of the communication terminal according to the second embodiment.

Hitherto, the processing sequence of the entire remote diagnosis system including the communication terminal 1010, the relay device 1030, and the device 1050 has been described. Next, the communication terminal 1010 is focused, and the flow of the remote diagnosis processing on the device 1050 will be described. FIGS. 11 and 12 are flowcharts of the remote diagnosis processing in the communication terminal 1010.

In the previous stage, the inspection instruction file 1061 is prepared through the operation of the operator. The inspection instruction file preparation section 1011 refers to the device database 1015, acquires the IP address of the device 1050, or the diagnosis target, designated by the operator, and writes this IP address in the inspection instruction file 1061.

In this state, first, the inspection start request section 1016 checks whether or not the inspection instruction file 1061 is prepared (step S1301), and when it is prepared, reads the IP address of the transmission destination, or the diagnosis target, from the inspection instruction file 1061 (step S1302).

Next, the reply mode is determined from the inspection item registered in the inspection instruction file 1061, which is then recorded in a configuration memory, etc. (step S1303). The communication terminal 1010 includes a condition set file in which each inspection item and the reply mode (the batch mode or the interactive mode) are corresponded, and in accordance with this condition set file, the reply mode is determined. For example, the batch mode is corresponded to the inspection item of which a time is required for the inspection. Alternately, the mode may be explicitly selected by the operator. Namely, the reply mode may be automatically set from the inspection item, etc., or the reply mode may be set by a manual operation of the operator.

Next, the inspection start request section 1016 acquires the information on the number of UDP transmissions and the interval of UDP transmissions from the UDP transmission definition file (step S1304) stored in the storage section not shown, and in accordance with this information, transmits the UDP packet targeting the IP address acquired in step S1302 (step S1305). For example, the UDP packet is transmitted five times at one-second intervals.

After the UDP packet is transmitted a predetermined number of times, the communication terminal 1010 opens a standby port for the TCP connection (here, as shown in the figure, port number is defined as N.), and transmits to the standby status for the TCP connection demand (step S1306). Thus, it is so prepared that the TCP connection can be established instantly at the point in time when the TCP connection demand is generated from the device 1050.

Then, when the TCP connection demand is not received (NO in step S1307), timing by a timer is started (step S1308), and the TCP connection demand is monitored until a prescribed time elapses (step S1309). Then, when the TCP connection demand is not received after a prescribed time elapsed, the transmission error processing of the inspection instruction file 1061 is performed (step S1310). For example, the message reading "transmission of the inspection instruction file is failed" is displayed on the monitor 1014.

When the TCP connection demand is received in step S1307, mode designation is performed to the inspection instruction file 1061 after the TCP connection is established (step S1311). Namely, the information on the reply mode set in step S1303 is written in the header of the inspection instruction file 1061. Then, the inspection instruction file 1061 is transmitted to the device 1050 (step S1312). After the inspection instruction file 1061 is transmitted, the communication terminal 1010 transmits to a standby status as to whether or not the data is received (step S1314). When the interactive mode is set as the reply mode (YES in step S1313), and when the data is not received, the timing of the timer is started (step S1315), and the standby status for receiving data is kept until a prescribed time elapses (step S1316). Then, when the data is not received even if the prescribed time elapsed, there is a possibility that the interactive mode is switched to the batch mode on the side of the device 1050, although the interactive mode is designated. Therefore, the processing is moved to the batch mode of FIG. 12.

When the data is received in step S1314, the reception processing of the inspection result file 1062 is performed (step S1318). Namely, the reception processing of the inspection result file 1062 returned from the device 1050 is performed. Next, the disconnection processing of the TCP connection is performed (step S1319). The content of the inspection result recorded in the received inspection result file 1062 is displayed on the monitor 1014, for example. In this way, the communication terminal 1010 can obtain the inspection result.

When the batch mode is designated as the reply mode (NO in step S1313), the disconnection demand from the device 1050 is received, and the TCP connection is disconnected (step S1320). Thus, the processing is moved to step S1321 of FIG. 12. Alternately, when the TCP disconnection demand is received from the device 1050 in the step not shown after a prescribed time elapsed in step S1316 of FIG. 11 (changed from the interactive mode to the batch mode), the TCP connection is disconnected and thereafter, the processing is moved to step S1321 of FIG. 12.

Subsequently, the flowchart of the processing related to the batch mode of FIG. 12 will be described. The communication terminal 1010 transmits to the standby status for the TCP connection by using the port number obtained by adding 1 to the TCP port number at the time of transmitting the inspection instruction file 1061 (step S1321). Namely, in step S1306, the standby status is set by using the port number N. However, here, the TCP port of the port number N+1 is opened and the communication terminal 1010 is set in the standby status. The rule of adding 1 to the port number in the batch mode is previously defined with the device 1050, and is written in the configuration file, etc.

Then, the TCP connection demand from the device 1050 is awaited (step S1322), and when the TCP connection demand is not received, the timing by the timer is started (step S1323). Then, when the connection demand is not received until a prescribed time elapsed (YES in step S1324), the transmission error processing of the inspection instruction file 1061 is performed (step S1325). For example, the message reading "transmission of the inspection instruction file is failed" is displayed on the monitor 1014.

When the TCP connection demand is received in step S1322, the reception processing of the inspection result file 1062 is performed (step S1326). Namely, the reception processing of the inspection result file 1062 returned from the device 1050 is performed. Next, the disconnection processing of the TCP connection is performed (step S1327). The content of the inspection result recorded in the received inspection result file 1062 is displayed on the monitor 1014, for example. In this way, the communication terminal 1010 can obtain the inspection result.

Figure 13:
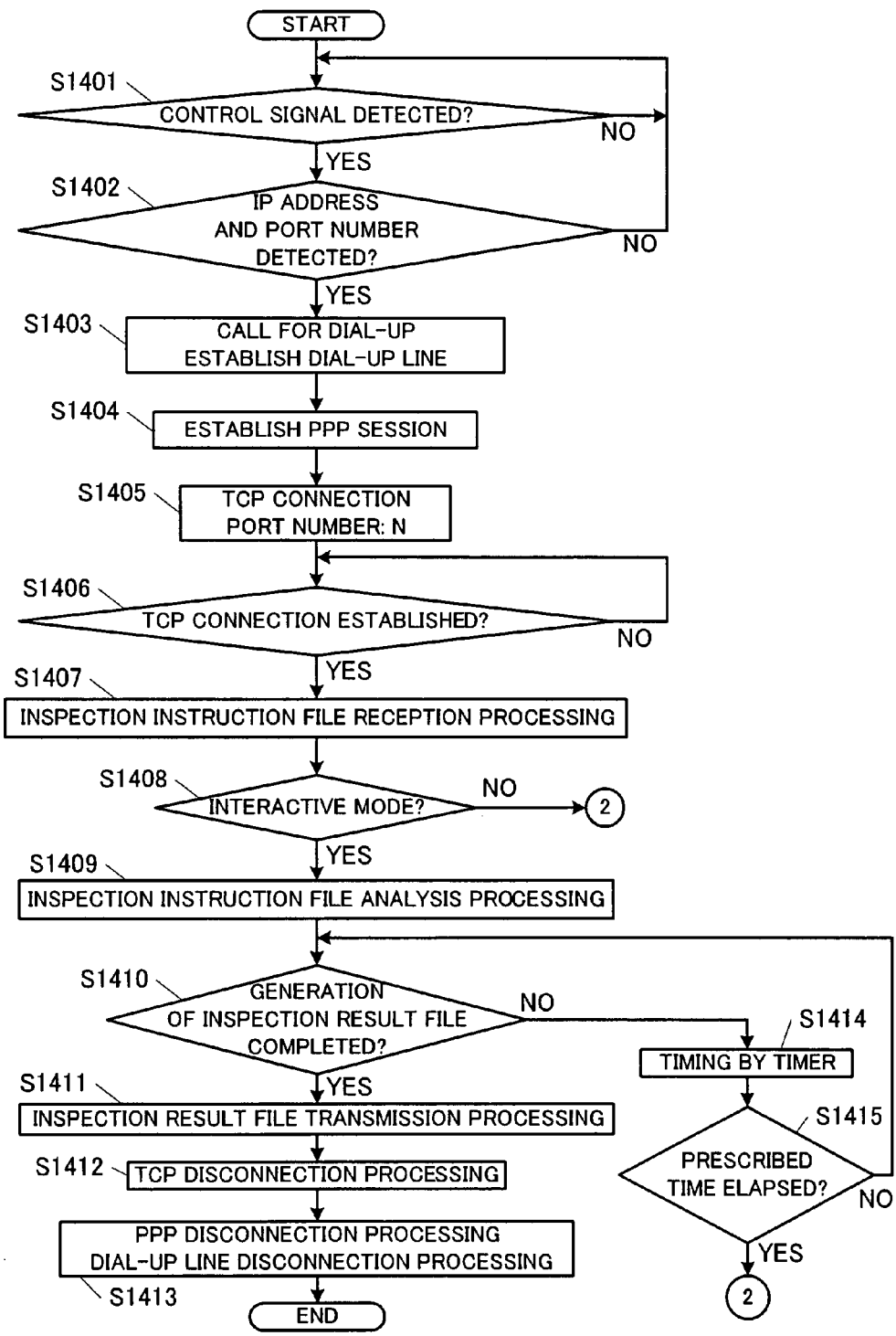
FIG. 13 is a processing flowchart of the device in a factory according to the second embodiment.
Figure 14:
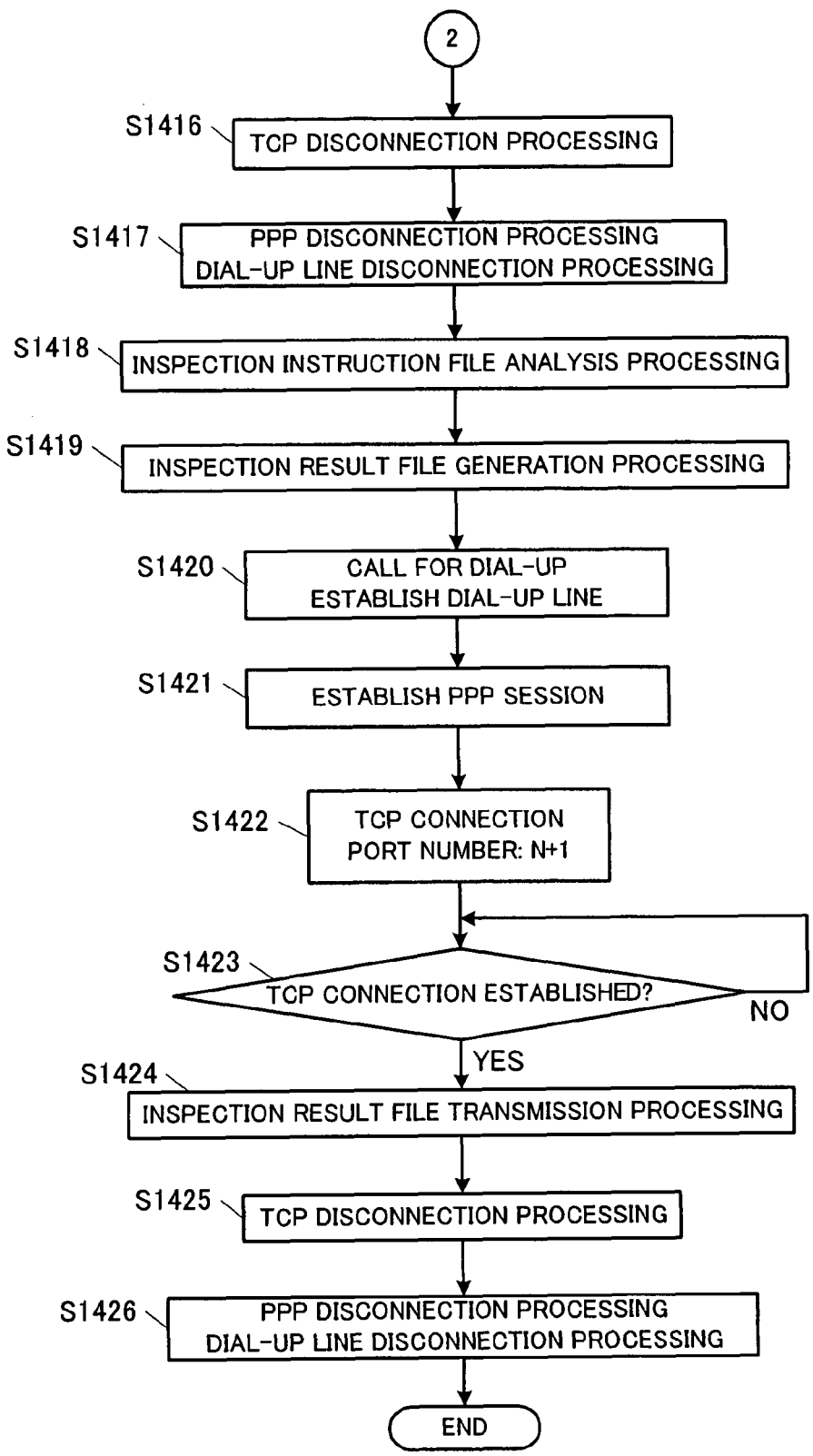
FIG. 14 is a processing flowchart of the device in the factory according to the second embodiment.

FIGS. 13 and 14 are processing flowcharts of the remote diagnosis focusing on the device 1050. The device 1050 is set in the standby status for receiving the control signal 1063 from the relay device 1030 (step S1401). When the control signal 1063 is received, the device 1050 checks whether or not the IP address and the port number are included in the control signal 1063 (step S1402). This IP address is the IP address of the communication terminal 1010, or the transmission source of the inspection instruction file 1061, and the port number is the number of the port at which the communication terminal 1010 stands by for the TCP connection demand (in this example, the port number is N). When the IP address and the port number are not included, this is a control signal for another processing. Therefore, the another processing (not shown) is performed, and the standby status for receiving the control signal 1063 is set again.

When the IP address and the port number are included in the control signal 1063, the PPP connection section 1054 originates the call for dial-up to the PPP connection section 1033 of the relay device 1030, and the dial-up line network is established (step S1403). Then, the PPP session is established on the dial-up connection (step S1404).

Subsequently, the communication section 1052 makes the TCP connection demand to the communication terminal 1010, by using the IP address and the port number (port number N) acquired in step S1302 (STEP S1405). Then, the establishment of the TCP connection is awaited (step S1406), and when the TCP connection is established, the communication section 1052 performs the reception processing of the inspection instruction file 1061 (step S1407). The device 1050 acquires the information on the reply mode from the header of the received inspection instruction file 1061, and determines the reply mode (step S1408).

When the interactive mode is designated as the reply mode (YES in step S1408), the inspection item or the inspection instruction command written in the inspection instruction file 1061 is analyzed (step S1409), and the inspection is conducted in accordance with the inspection item or the inspection instruction command thus obtained. After the inspection is conducted, preparation of the inspection result file 1062, in which the inspection result is written, is started. Then, whether or not the preparation of the inspection result file 1062 is completed is checked (step S1410).

When the preparation of the inspection result file 1062 is not completed, the timing of the timer is started (step S1414), and the completion of the inspection result file 1062 is awaited until a prescribed time elapses (step S1415). When the inspection result file 1062 is not completed even if the prescribed time elapsed, the processing is moved to the step of FIG. 14. Namely, the processing is moved to the batch mode because much time is consumed for conducting the inspection, although the interactive mode is designated.

When the preparation of the inspection result file 1062 is successfully completed (YES in step S1410), the inspection result file 1062 is transmitted to the communication terminal 1010 (step S1411). Namely, the inspection result file 1062 is returned, while maintaining the TCP connection used in the transfer of the inspection instruction file 1061 as it is.

When the transmission of the inspection result file 1062 is finished, the disconnection processing of the TCP connection is performed (step S1412). Then, the disconnection processing of the PPP session is performed and finally the disconnection of the dial-up line network is performed (step S1413).

When the reply mode is determined to be the batch mode in step S1408 (namely, when the batch mode is designated from the communication terminal 1010), or when a prescribed time elapsed in step S1415 (namely, although the interactive mode is designated from the communication terminal 1010, much time is consumed in the inspection), the processing is moved to the batch mode of FIG. 14.

First, the device 1050 makes the demand for the TCP disconnection to the communication terminal 1010, and performs the disconnection processing of the TCP connection (step S1416), and subsequently, disconnects the PPP session and disconnects the dial-up line (step S1417).

The device 1050 analyzes the content of the inspection instruction file 1061 in the state of disconnecting the line (step S1418), and conducts the inspection of the inspection item in accordance with the content thus obtained. Then, the inspection result file 1062 is prepared (step S1419).

When the preparation of the inspection result file 1062 is completed and the transmission of the inspection result file 1062 is prepared, the device 1050 originates the call for dial-up to the relay device 1030 without waiting for the reception of the control signal 1063 and establishes the dial-up line (step S1420), and then establishes the PPP session (step S1421).

Then, by adding 1 to the TCP port number (port number N) used in receiving the inspection instruction file 1061, thereby designating the TCP port of port number N+1 to transmit the TCP connection demand to the communication terminal 1010 (step S1422). As shown in step S1321 of FIG. 12, the communication terminal 1010 opens the TCP port of the port number N+1 and is set in the standby status. Thus, when the TCP connection is established (step S1423), the device 1050 transmits the inspection result file 1062 using this TCP connection (step S1424). After the file transmission is finished, the TCP disconnection is performed (step S1425), and the PPP session and the dial-up line are disconnected (step S1426).

In this way, according to the remote diagnosis system of this embodiment, when the inspection is started, the UDP packet is sent from the communication terminal 1010 on the side of transmitting the inspection instruction file 1061. Then, the communication terminal 1010 that transmitted the UDP packet is set in the standby status for the TCP connection. And then, demands for the connection of the dial-up line and the TCP connection are made from the device 1050 that has received the control signal 1063 transmitted based on the UDP packet. Accordingly, at the point in time when the device 1050 establishes the line network by the dial-up connection, the TCP connection can be established instantly.

In addition, the communication terminal 1010 designates whether or not the inspection result file 1062 is received while maintaining the TCP connection as it is at the time of transmitting the inspection instruction file 1061, or whether or not another TCP connection is newly established and the inspection result file is received after disconnecting the line network once. Thus, when much time is required for conducting the inspection or preparing the inspection result file 1062, it is possible to obviate the problem that the communication is disconnected in the middle of processing.

Namely, in a case of the non-continuous connection such as the dial-up connection between the device 1050 and the relay device 1030 as in this embodiment, when the transmission/reception of data is not detected for a prescribed time, the line network is sometimes disconnected. When such a line abnormality occurs in the state where the communication terminal 1010 is set in a standby status for the reception of the inspection result file 1062, recovery processing thereof becomes complicated. Therefore, the inspection requiring much time is previously defined, and the batch mode is applied to the inspection instruction including such an inspection item. Thus, after the inspection instruction file 1061 is received, the device 1050 disconnects the line and establishes the line again when the transmission of the inspection result file 1062 is prepared. Accordingly, it is possible to prevent the occurrence of a line abnormality error in the middle of a series of processing.

Hitherto, the second embodiment of the present invention has been described. However, the connection between the relay device 1030 and the device 1050 is not limited to the telephone line but may be a wireless network. Namely, the present invention can generally be applied to the network in which the connection between the device 1050 and the relay device 1030 is the non-continuous connection and the line can be established only from the device 1050. In addition, under the condition that the connection between the communication terminal 1010 and the relay device 1030 is the continuous connection, an exclusive line can also be used in addition to the Internet.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims are intended to cover all modifications of the present invention that fall within the true spirit and scope of the present invention.

What is claimed is:

1. A remote diagnosis system comprising:
   a control device;
   a relay device which is continuously connected to said control device; and
   an inspection target device which is connected to said relay device by a communication network established by a connection demand from the inspection target device, wherein
   said control device includes a unit for transmitting a UDP (User Datagram Protocol) packet to said inspection target device,
   said relay device includes a unit for transmitting a control signal to said inspection target device when said UDP packet transmitted from said control device is received,
   said inspection target device includes a unit for establishing said communication network by making the connection demand to said relay device and transmitting a TCP (Transmission Control Protocol) connection demand to said control device, when said control signal is received, and
   by the TCP connection demand from said inspection target device, a TCP connection is established between said control device and said inspection target device, and thereafter said control device transmits an inspection instruction file to said inspection target device by using this TCP connection.

2. The remote diagnosis system according to claim 1, wherein said inspection target device that received said inspection instruction file conducts an inspection in accordance with said inspection instruction file, and thereafter transmits an inspection result file to said control device by using the TCP connection used for transmitting said inspection instruction file.

3. The remote diagnosis system according to claim 1, wherein said control device repeatedly transmits the UDP packet to said inspection target device a prescribed number of times.

4. The remote diagnosis system according to claim 2, wherein said control device repeatedly transmits the UDP packet to said inspection target device a prescribed number of times.

5. The remote diagnosis system according to claim 3, wherein said control device transits to a standby status for a TCP connection from said inspection target device after the UDP packet is transmitted a prescribed number of times.

6. The remote diagnosis system according to claim 4, wherein said control device transits to a standby status for a TCP connection from said inspection target device after the UDP packet is transmitted a prescribed number of times.

7. A communication system comprising:
   a first communication device;
   a relay device which is continuously connected to said first communication device; and
   a second communication device which is connected to said relay device by a communication network established by a connection demand from the second communication device, wherein
   said second communication device includes a unit for establishing the communication network by making the connection demand to said relay device and transmitting a TCP (Transmission Control Protocol) connection demand to said first communication device,
   said first communication device includes a unit for establishing a TCP connection with said second communication device by the TCP connection demand from said second communication device and transmitting a transmission file to said second communication device by designating a reply mode, and
   said second communication device transmits a reply file while maintaining the TCP connection used in receiving the transmission file when a first mode is designated as the reply mode, and when a second mode is designated, disconnects the communication network with said relay device, and after a communication network with said relay device is established again, establishes a new TCP connection and transmits the reply file.

8. The communication system according to claim 7, wherein said second communication device establishes the communication network again when transmission of the reply file is prepared, after the communication network with said relay device is disconnected.

9. The communication system according to claim 7, wherein said second communication device disconnects the communication network with said relay device when it is determined that, even when said first mode is designated as the reply mode, time required for reply processing of the reply file corresponds to a prescribed condition, and after the communication network with said relay device is established again, establishes a new TCP connection and transmits the reply file.

* * * * *